(12) United States Patent
Kushida et al.

(10) Patent No.: US 6,664,748 B2
(45) Date of Patent: Dec. 16, 2003

(54) ELECTRIC VACUUM CLEANER

(75) Inventors: Hiroyuki Kushida, Odawara (JP); Tomokazu Yoshioka, Yokohama (JP); Tsuyoshi Takanose, Fuji (JP); Takuya Ogishima, Tagata-gun (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/101,101

(22) Filed: Mar. 20, 2002

(65) Prior Publication Data

US 2002/0175646 A1 Nov. 28, 2002

(30) Foreign Application Priority Data

May 23, 2001 (JP) ........................................ 2001-154611
Jun. 4, 2001 (JP) ........................................ 2001-167761

(51) Int. Cl.[7] .............................. H02P 5/00; A47L 5/12
(52) U.S. Cl. ........................... 318/139; 15/339; 15/319
(58) Field of Search ................................ 318/139, 445, 318/446, 650; 15/DIG. 1, 319, 339

(56) References Cited

U.S. PATENT DOCUMENTS

| | | | | |
|---|---|---|---|---|
| 4,835,409 A | * | 5/1989 | Bhagwat et al. | 15/DIG. 1 |
| 5,014,386 A | * | 5/1991 | Worwag | 15/339 |
| 5,072,484 A | | 12/1991 | Edlund | |
| 6,218,798 B1 | * | 4/2001 | Price et al. | 318/445 |
| 6,345,408 B1 | * | 2/2002 | Nagai et al. | 15/361 |
| 6,448,732 B1 | * | 9/2002 | Block | 318/442 |

FOREIGN PATENT DOCUMENTS

| | | | |
|---|---|---|---|
| EP | 0 438 827 | 7/1991 | |
| GB | 2 237 185 | 5/1991 | |
| GB | 2 288 115 | 10/1995 | |
| JP | 2001340276 A | * 12/2001 | ............ A47L/9/28 |
| WO | WO 89/11816 | 12/1989 | |
| WO | WO 90/09138 | 8/1990 | |

OTHER PUBLICATIONS

Patent Abstracts of Japan, JP 2001–016845, Jan. 19, 2001.
Patent Abstracts of Japan, JP 8–224198, Sep. 3, 1996.

* cited by examiner

*Primary Examiner*—Shih-Yung Hsieh
*Assistant Examiner*—Eduardo Colon-Santana
(74) *Attorney, Agent, or Firm*—Oblon, Spivak, McClelland, Maier & Neustadt, P.C.

(57) ABSTRACT

An electric vacuum cleaner according to the present invention boosts a voltage supplied to a motor-driven blower through the use of a boost converter circuit with a DC power supply as a drive source to thereby increase the output of the motor-driven blower so as to enhance dust suction power. The present invention provides, as operation modes of such an electric vacuum cleaner, an operation mode for boosting power inputted to the motor-driven blower with the boost converter circuit to thereby increase dust suction power, and an operation mode for deactivating the boost converter circuit. Consequently, the boost converter circuit is used to enable the boosting of the power inputted to the motor-driven blower only when really required, and a loss in power produced due to the mounting of the boost converter circuit can be reduced. Thus, the service hour per charge for a battery can be set to a level equivalent to an electric vacuum cleaner equipped with no boost converter circuit.

10 Claims, 29 Drawing Sheets

Fig. 28(A)  Fig. 28(B)
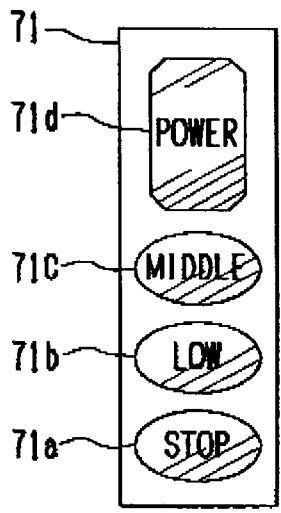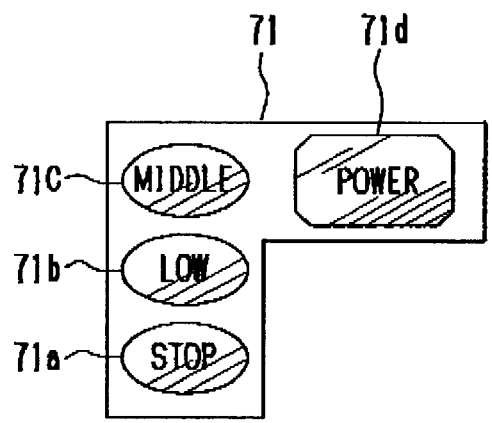
Fig. 29(A)  Fig. 29(B)
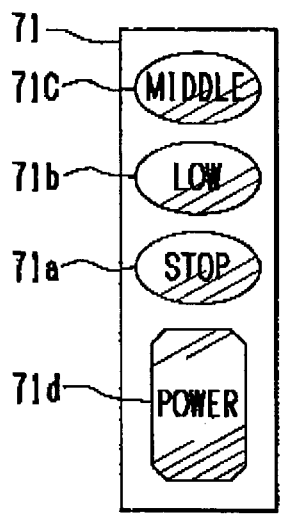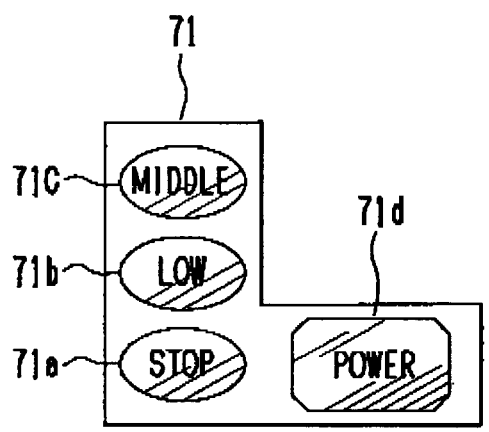

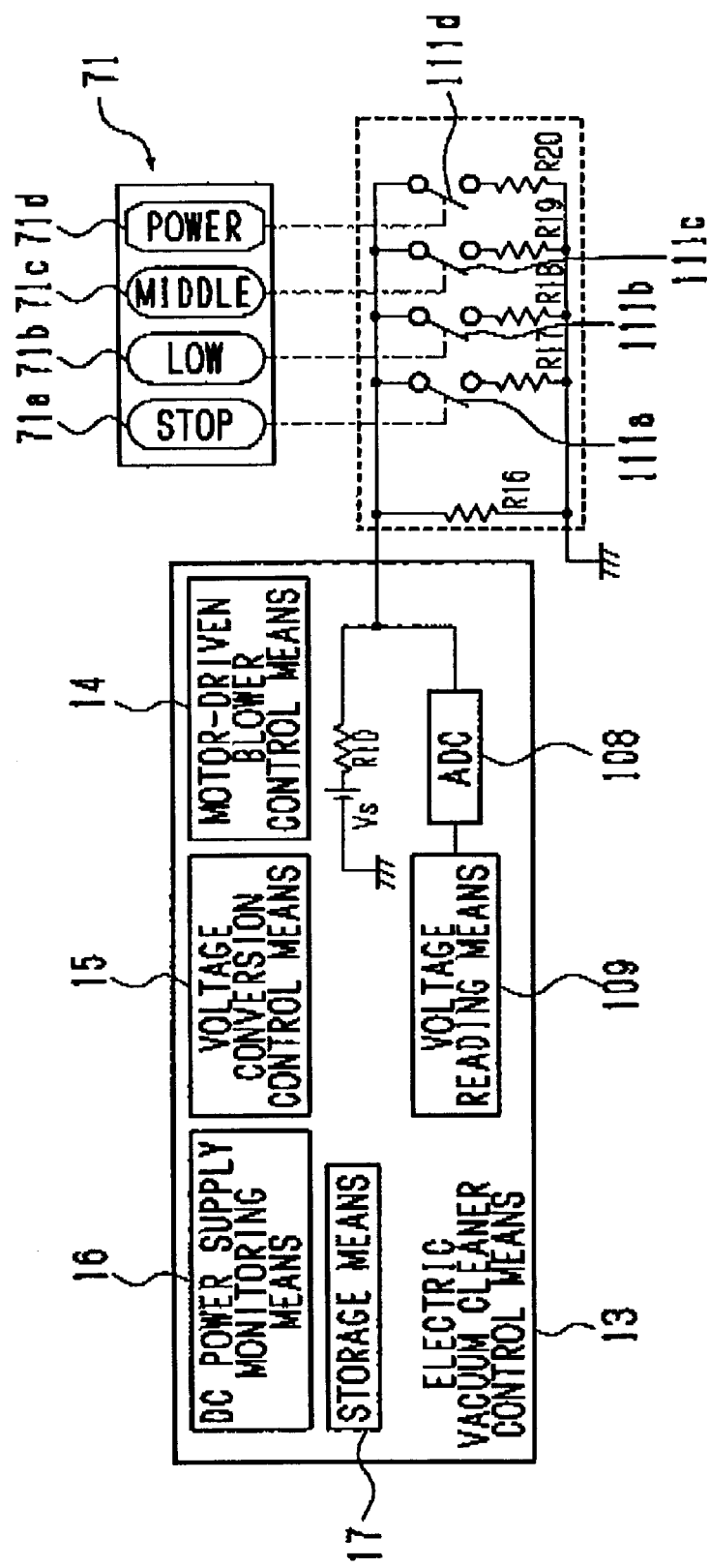

ELECTRIC VACUUM CLEANER

CROSS REFERENCE TO RELATED APPLICATIONS

The present application is based on Japanese Priority Documents P2001-154611 filed on May 23, 2001 and P2001-167761 filed on Jun. 4, 2001, the content of which is incorporated herein by reference.

BACKGROUND OF THE INVENTION

1. Field of the Invention

The present invention relates to an electric vacuum cleaner and particularly to a battery-operated electric vacuum cleaner.

2. Discussion of the Background

As a method of boosting the output of a motor-driven blower of a battery-operated electric vacuum cleaner to thereby enhance dust suction power, there has generally been known a method of increasing power inputted to a motor-driven blower. Described specifically, windings of a motor-driven blower are changed, a current inputted to the motor-driven blower increases, or a source voltage is boosted to thereby increase the input to the motor-driven blower.

When an attempt is made to increase an input current where the motor-driven blower is made up of a commutator motor, carbon at a brush portion brought into contact with a commutator will wear and the motor-driven blower becomes easy to break due to sparks developed in the commutator, whereby it is hard to ensure reliability.

To this end, there is considered a method of boosting a source voltage applied to a motor-driven blower as another method of increasing the power inputted to the motor-driven blower. In the case of a battery-operated electric vacuum cleaner, a method of increasing the number of batteries is the simplest as the method of boosting the source voltage. However, when a high voltage is required, a battery will increase in size when an attempt to realize it by virtue of the battery alone is made. Thus, a method of acquiring a high voltage by using a boost converter circuit has been proposed to solve it. As such an example, there has been known, for example, Unexamined Patent Publication Nos. Hei 8(1996)-224198 and 2001-16845.

In the case of the battery-operated electric vacuum cleaner, the service hour per charge is one of performance important for a user. However, the electric vacuum cleaner is accompanied by a problem that when a boost converter circuit is mounted to the electric vacuum cleaner, the service hour per charge is shortened due to a loss produced upon boosting the voltage by the boost converter circuit.

The invention disclosed in Unexamined Patent Publication No. Hei 8(1996)-224198 is one equipped with a switching means for switching a power supply for supplying power to a motor-driven blower to any one of a commercial source power and a secondary battery. When power is supplied from the secondary battery to the motor-driven blower, a voltage in the power is boosted by a boost converter circuit to drive and-control an AC commutator motor. However, Unexamined Patent Publication No. Hei 8(1996)-224198 does not show a specific disclosure about the relationship between the driving operations of the electric vacuum cleaner and the operation of the boost converter circuit and does not provide suggestions either. Therefore, the electric vacuum cleaner with the secondary battery as a drive source practically involves a demand to reduce power consumption as practicable to thereby make the service hour per charge as long as possible with a view toward lightning cumbersomeness such as a charging operation. On the other hand, Unexamined Patent Publication No. Hei 8(1996)-224198 does not show a solution to such a demand.

In a manner similar to Unexamined Patent Publication No. Hei 8(1996)-224198, Unexamined Patent Publication No. 2001-16845 simply describes that the electric vacuum cleaner is equipped with the boost converter circuit and does not show a specific description indicative of the relationship between the driving operations of the electric vacuum cleaner and the operation of the boost converter circuit. Therefore, Unexamined Patent Publication No. 2001-16845 does not show any solution to the demand to reduce the power consumption as practicable and make the service hour per charge as long as possible for the purpose of lightening the cumbersomeness such as the charging operation, for example.

Particularly when a use form of the electric vacuum cleaner is taken into consideration, a user does not use a cleaner at all times in a state in which power consumption is set to a maximum and dust suction power is kept in the highest state. Therefore, there has been a demand for the provision of an electric vacuum cleaner having functions such as an ability to make long the service hour per charge.

When it is desired to put into practical use an electric vacuum cleaner equipped with a boost converter circuit with a DC power supply as a drive source, it is necessary to take into consideration, for example, avoidance of abnormal conditions of the electric vacuum cleaner incident to the operation of the boost converter circuit, protection of a battery and respective constituent electronic components against the operational malfunction of the boost converter circuit, an influence on the motor-driven blower at the operation of the boost converter circuit, and the relationship between the operation of the boost converter circuit and dust suction power, etc.

However, while Unexamined Patent Publication No. Hei 8(1996)-224198 has described that upon boosting, a boost voltage gradually rises from a low voltage to a predetermined voltage, the present publication does not show items required upon putting into practical use the electric vacuum cleaner equipped with the boost converter circuit with the DC power supply as the drive source, e.g., any disclosure such as a reduction in power loss involved upon boosting and does not show any suggestions either.

Further, Unexamined Patent Publication No. 2001-16845 does not disclose these technologies either.

SUMMARY OF THE INVENTION

An object of the present invention is to hold to a required minimum, a power loss produced due to the mounting of a boost converter circuit in an electric vacuum cleaner equipped with the boost converter circuit with a DC power supply as a drive source.

Another object of the present invention is to reduce in size and weight, an electric vacuum cleaner equipped with a boost converter circuit with a DC power supply as a drive source.

The object of the present invention is achieved by the novel electric vacuum cleaner of the present invention.

According to the novel electric vacuum cleaner of the present invention, a voltage supplied to a motor-driven blower with a DC power supply as a drive source is boosted by a boost converter circuit to thereby increase the output of the motor-driven blower so as to enhance dust suction power. The present invention provides, as operation modes of such an electric vacuum cleaner, an operation mode for boosting power inputted to the motor-driven blower by voltage converting means for boosting a voltage outputted from the DC power supply and thereby supplying power to the motor-driven blower, and an operation mode for deboosting the power inputted to the motor-driven blower by the voltage converting means. Consequently, the power inputted to the motor-driven blower can be boosted only when really required, and a loss in power produced due to the mounting of the voltage converting means can be reduced.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 28 is a front view showing another example of an operation unit of the electric vacuum cleaner according to the embodiment of the present invention;

FIG. 29 is a front view depicting a further example of the operation unit of the electric vacuum cleaner according to the embodiment of the present invention; and FIG. 30 is a circuit diagram illustrating a further example of the operation mode switching operation unit of the electric vacuum cleaner according to the embodiment of the present invention.

DETAILED DESCRIPTION OF THE PREFERRED EMBODIMENTS

Preferred embodiments of the present invention will be described based on FIGS. 1 through 30.

Figure 1:
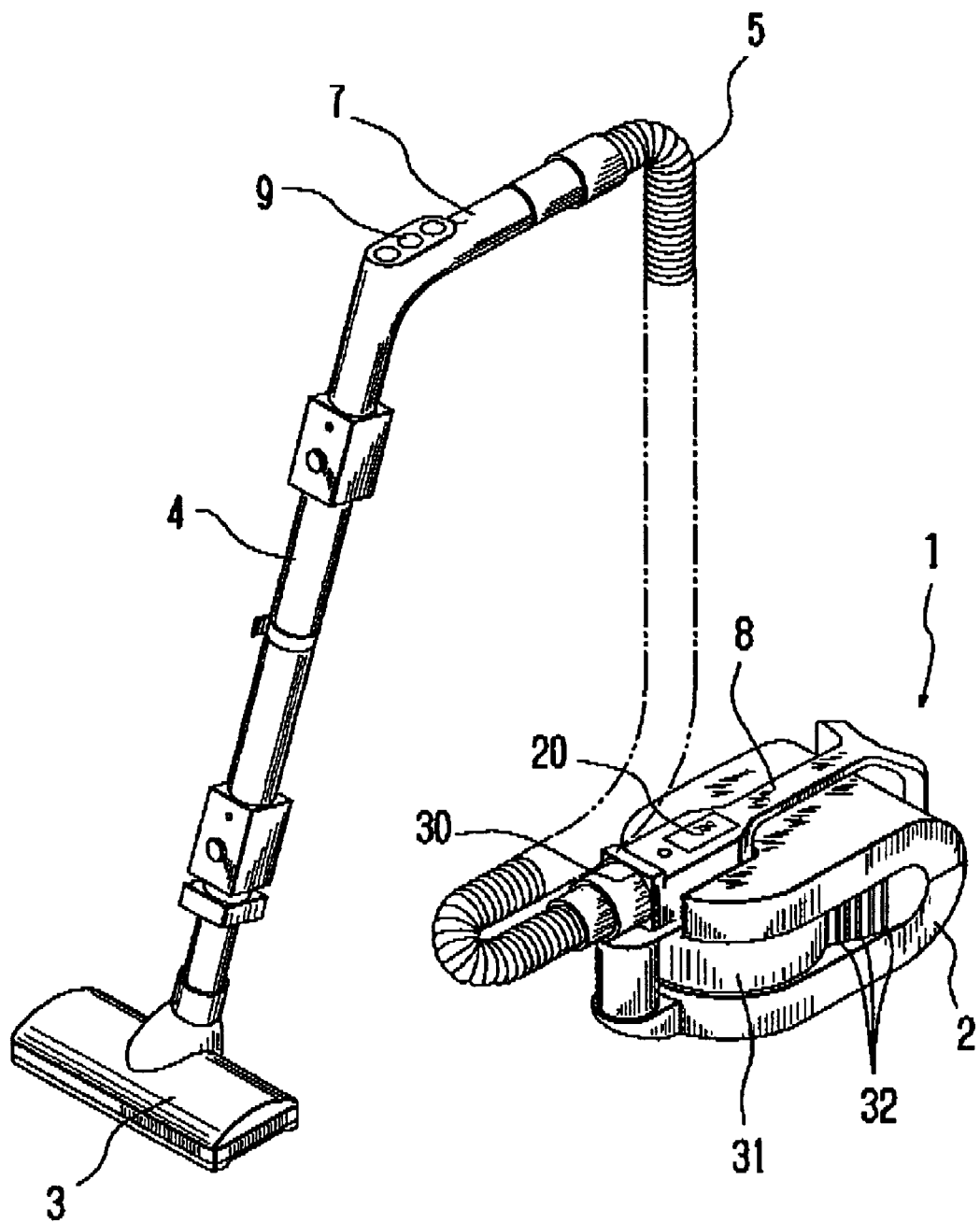
FIG. 1 is a perspective view showing an outward appearance of an electric vacuum cleaner according to an embodiment of the present invention.

FIG. 1 is a perspective view showing an external configuration of an electric vacuum cleaner according to the present embodiment. The electric vacuum cleaner 1 according to the present embodiment has a configuration wherein a hose body 5 detachably connected with an extension pipe 4 used as a flexible connecting pipe detachably provided with a suction or inlet body 3 at its leading end portion is detachably attached to a body inlet 30 of a body case 2 thereof. A motor-driven blower 6 and a DC power supply 10 (see FIG. 3) are built in the body case 2. A handle 8 used as a knob means is provided on an upper surface of the body case 2. The handle 8 is formed in a substantially Y-shape as viewed in a plane surface.

Charge terminals (not shown) set to a charging bed or base to supply power to the DC power supply 10 for thereby charging the DC power supply 10 are provided substantially in the center of a rear face of the body case 2.

The hose body 5 having flexibility has a base end detachably connected to the body inlet 30 so as to communicate with the suction side of the motor-driven blower 6 through a dust cup 31 (see FIG. 2) used as a closed-end cylindrical dust collection cup. A plurality of outlets or exhaust ports 32 open in a substantially front lateral direction in communication with the motor-driven blower 6 are defined in side plate portions of the body case 2.

A hand control 7 used as an operation means bent in a substantially "dogleg" form is provided at the leading end of the hose body 5. The hand control 7 is provided with a control unit 9 used as a control or control part at a position where it can be operated with the fingers of an operator.

Figure 2:
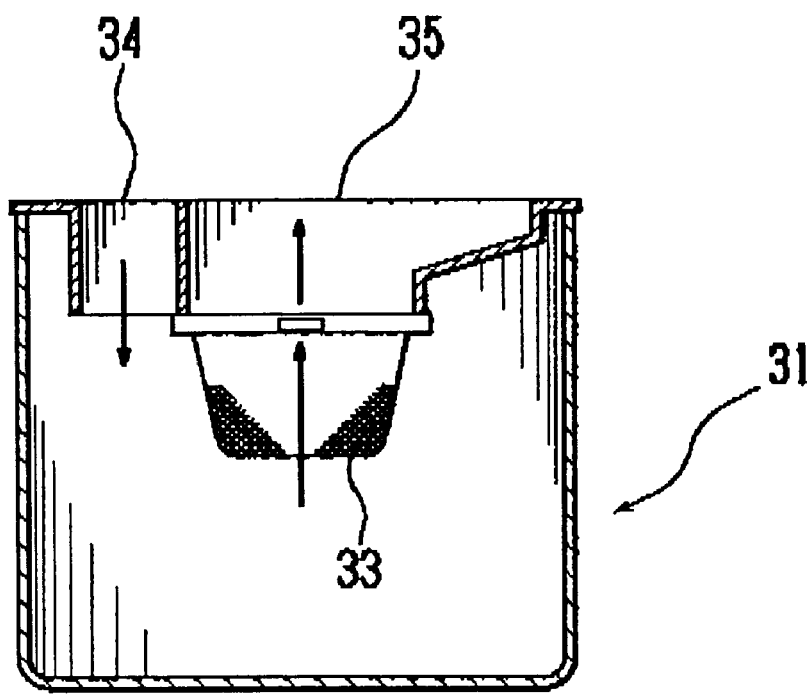
FIG. 2 is a cross-sectional view showing a dust cup employed in the embodiment of the present invention.

As shown in FIG. 2, the dust cup 31 has a closed-end structure, and (the dust cup 31) is provided with a dust cup inlet 34 extending along the side wall of the dust cup 31. A prefilter 33 formed of a mesh member having permeability is detachably attached to a substantially central upper portion of the dust cup 31. Further, a dust cup exhaust port 35 is provided over the prefilter 33. The dust cup exhaust port 35 communicates with the motor-driven blower 6. Thus, the dust cup 31 having such a structure makes use of a dust collection system for activating the motor-driven blower 6 to thereby rotate air tornadically (cyclonically) and separate dust and air by centrifugal force.

Incidentally, a dust collection system using a paper pack may be used as the dust collection system.

Figure 3:
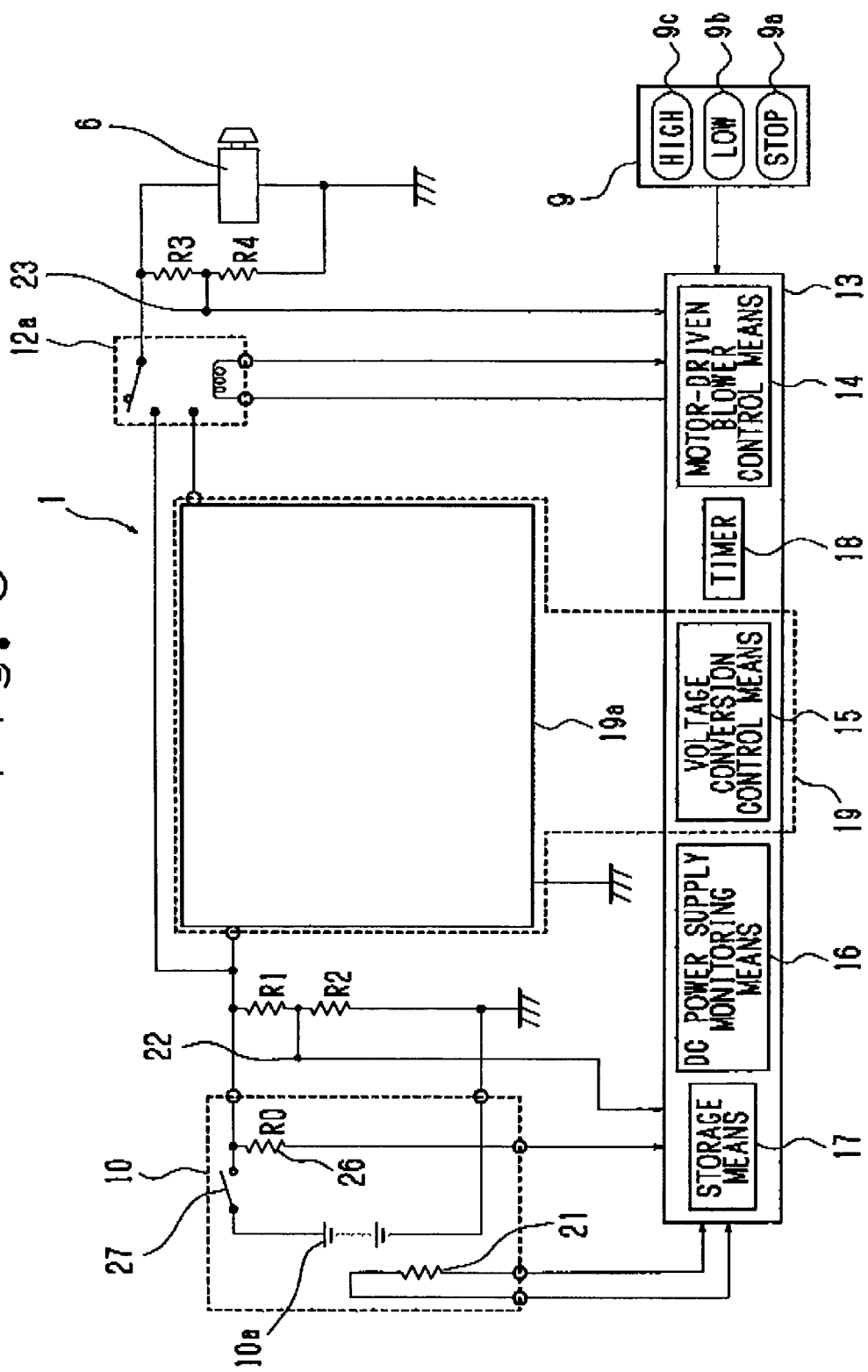
FIG. 3 is a circuit diagram illustrating one example of a control circuit of the electric vacuum cleaner according to the embodiment of the present invention.

Further, the operation mode switching control unit 9 shares the use of a power switch for the motor-driven blower 6 and is configured so as to be capable of selecting and setting a plurality of types of operation modes for respectively bringing the motor-driven blower 6 to driven states different from one another. Described specifically, as shown in FIG. 3, a control button (switch for stop) 9a for stop setting corresponding to an operation mode, a control button 9b for low operation setting corresponding to an operation mode, and a control button 9c for high-operation setting corresponding to an operation mode are sequentially arranged side by side in a line in the direction of the extension pipe 4 as viewed from the hose body 5.

[Control Circuit]

A configuration of a control circuit for the motor-driven blower 6 employed in the electric vacuum cleaner 1 having such a structure, and its operation will be explained with reference to FIGS. 3 through 10.

The motor-driven blower 6 placed within a housing 2 is connected to a power supply circuit via a switching part 12a used as a switching means. The power circuit comprises the DC power supply 10 chargeable via the charge terminals (not shown), and a voltage converting means 19 which boosts a voltage outputted from the DC power supply 10 and outputs it to the motor-driven blower 6. The switching part 12a is an electromagnetic relay and is a part which causes a current to flow in a coil to excite it, thereby performing a switching operation.

An electric vacuum cleaner control means 13 is connected to control terminals of the switching part 12a. The electric vacuum cleaner control means 13 comprises a motor-driven blower control means 14, a voltage conversion control means 15, a DC power supply monitoring means 16, a storage means 17 and a timer means 18, etc. The electric vacuum cleaner control means 13 is connected to the operation mode switching control unit 9 of the hand control 7. And the electric vacuum cleaner control means 13 is connected to a display means 20 including a plurality of light-emitting diodes disposed over the housing 2, a thermistor 21 for measuring the temperature of the DC power supply 10, a resistor R0 used as an identifying means for a secondary battery 10a, a voltage converting means input voltage detecting portion 22, a voltage converting means output voltage detecting portion 23, etc. The electric vacuum cleaner control means 13 controls the whole electric vacuum cleaner 1. The electric vacuum cleaner control means 13 comprises a plurality of circuit parts and a plurality of microcomputers or is configured with a one-chip microcomputer as the center.

A series circuit of a resistor R1 and a resistor R2 is connected between both ends of the secondary battery 10a. The electric vacuum cleaner control means 13 is connected to the voltage converting means input voltage detecting portion 22 between the resistors R1 and R2, and a voltage divided by the resistors R1 and R2 is applied to the electric vacuum cleaner control means 13.

Similarly, a series circuit of a resistor R3 and a resistor R4 is connected between both ends of the motor-driven blower 6. The electric vacuum cleaner control means 13 is connected to the voltage converting means output voltage detecting portion 23 between these resistors R3 and R4. A voltage divided by the resistors R3 and R4 is applied to the electric vacuum cleaner control means 13.

The motor-driven blower control means 14 is connected to the stop setting control button 9a, the low-operation setting control button 9b and the high-operation setting control button 9c of the operation mode switching control unit 9 respectively. These stop setting control button 9a, low-operation setting control button 9b and high-operation setting control button 9c are operated to perform switching to the switching part 12a, thereby inputting any one of an output voltage boosted by the voltage converting means 19 and a voltage outputted from the secondary battery 10a to the motor-driven blower 6.

[DC Power Supply]

The DC power supply 10 for supplying power comprises a secondary battery 10a obtained by connecting batteries such as a nickel-cadmium (NiCd) battery, a nickel metal hydride battery, a lithium ion battery, etc. in series in plural numbers, a thermistor 21, a resistor R0 used as an identifying means 26, and a thermostat 27, etc.

A plus terminal of the secondary battery 10a is connected to one end of the thermostat 27, whereas the other end thereof is connected to one end of the resistor R0.

[Voltage Converting Means]

Figure 4:
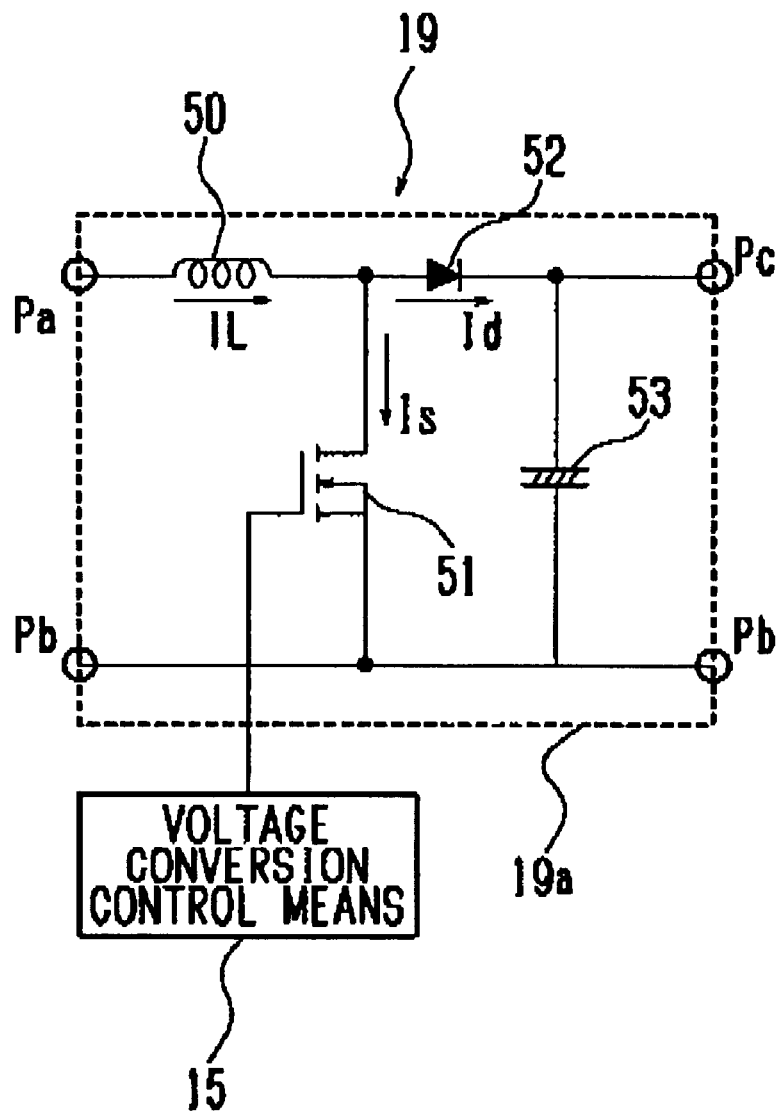
FIG. 4 is a circuit diagram depicting a circuit for a voltage converting means of the electric vacuum cleaner according to the embodiment of the present invention.

An example of a configuration of the voltage converting means 19 for the motor-driven blower 6 in the electric vacuum cleaner 1 is next shown in FIG. 4. The voltage converting means 19 comprises a magnetic part 50 such as a reactor which plays a role in storage and emission of energy, a switching part (Q) 51 using a semiconductor switching element such as a MOSFET, a bipolar transistor or an IGBT or the like, a counter-flow preventive part 52 (diode) for preventing a counterflow of the energy, a capacitor 53 corresponding to a capacitive impedance part element, and a voltage converting control means 15 or the like.

The reactor used as the magnetic part 50 principally comprises a winding (coil) and a core made of a magnetic material such as ferrite, a Fe—Al—Si alloy, a Fe—Ni alloy, an amorphous alloy or the like. The reactor stores energy by inserting the core into the winding and allowing a current to flow in the winding, and emits the energy in response to an off operation of the switching part (Q) 51. As the form of the core, may be mentioned, a solenoid form, a toroid form or the like.

The voltage conversion control means 15 has the function of controlling the switching part (Q) 51 for boosting the output voltage of the secondary battery 10a, i.e., setting the frequency and the duty, which is defined by on Time/(on Time+off time), of an on/off pulse signal and outputting the pulse signal. A voltage (boost rate) outputted from a voltage converting means main circuit 19a is adjusted based on the frequency or duty of the pulse signal outputted from the voltage converting control means 15. A ratio of an output voltage boosted by the voltage converting means 19 to an output voltage of the DC power supply 10 is referred to as a boost rate (boost rate=output voltage boosted by voltage converting means 19/output voltage of DC power supply 10). Further, the voltage conversion control means 15 operates in cooperate with the motor-driven blower control means 14.

Described more specifically, the voltage converting means 19 has an input terminal Pa and common terminal Pb connected to the DC power supply 10 side, and an output terminal Pc connected to the motor-driven blower 6 side. The voltage converting means 19 is configured as follows: The input terminal Pa is connected to one terminal of the magnetic part (reactor) 50, the other terminal of the magnetic part (reactor) 50 and a drain terminal of the switching part (Q) 51 are connected to each other, a source terminal of the switching part (Q) 51 and the common terminal Pb are connected to each other, the voltage conversion control means 15 is connected to a gate terminal of the switching part (Q) 51, a point where the reactor 50 and the switching part (Q) 51 are connected, and an anode terminal of the diode 52 are connected to each other, a cathode terminal of the diode 52 and one terminal of the capacitor 53 are connected to each other, the other terminal of the capacitor 53 and the common terminal Pb are connected to each other, a point where the diode 52 and the capacitor 53 are connected to each other, is connected to the output terminal Pc, and a voltage obtained by boosting the voltage of the DC power supply 10 is outputted between the output terminal Pc and the common terminal Pb.

A boosting operation of the voltage converting means 19 will now be described. When the switching part (Q) 51 is turned on by a pulse signal outputted from the voltage conversion control means 15, a current Is flows, so that energy is stored in the reactor 50 based on a current IL. Next, when the switching part (Q) 51 is turned off by the voltage conversion control means 15, the energy stored in the reactor 50 emits to the motor-driven blower 6 side via the diode 52 as a current Id, after which it is charged into the capacitor 53. Turning on and off the switching part (Q) 51 continuously by means of the voltage conversion control means 15 in this way allows implementation of the repetition of storage of energy from the DC power supply 10 to the reactor 50 and emits of energy from the reactor 50.

The energy charged in the capacitor 53 is not returned to the reactor 50 side owing to the diode 52. The capacitor 53 is charged at a voltage higher than that of the DC power supply 10, followed by supply to the motor-driven blower 6.

Figure 5:
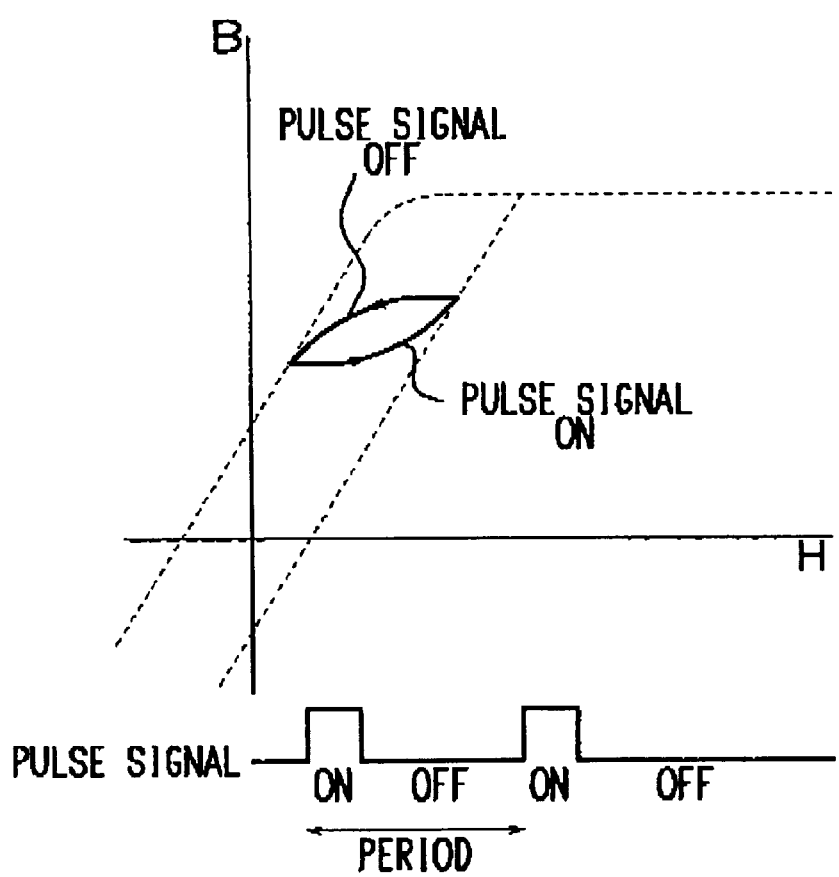
FIG. 5 is a B–H curve characteristic diagram conceptually showing the manner of magnetic flux of a reactor which constitutes the voltage converting means.

The boosting operation of this voltage conversion means 19 will now be explained in detail. The energy is stored in the reactor 50 with a remaining state of the energy by controlling at least one of the frequency and the duty of the pulse signal outputted from the voltage converting means 15. In other words, voltage converting means 15 outputs the controlled pulse signal and turns on the switching part (Q) 51 without emitting all the energy stored in the reactor 50 during the turning off of the switching part (Q) 51. The conceptual manner of magnetic flux in the core of the reactor 50 at this time is shown in FIG. 5. As is understood from FIG. 5, the product of a magnetic field H and a magnetic flux density B is not brought to zero during the turning on/off of the switching part (Q) 51.

Thus, according to the method of repeatedly performing the storage and emission of energy in the remaining state of the energy in the reactor 50 used as the magnetic part, the efficiency of availability of the reactor 50 used as the magnetic part is enhanced. It is therefore possible to reduce the peak of a current flowing in the reactor 50 and thereby take sufficient action with the reactor brought into less size and weight. Accordingly, the voltage converting means 19 can be reduced in size and weight, with the result that the electric vacuum cleaner 1 can also be reduced in size and weight.

Figure 6:
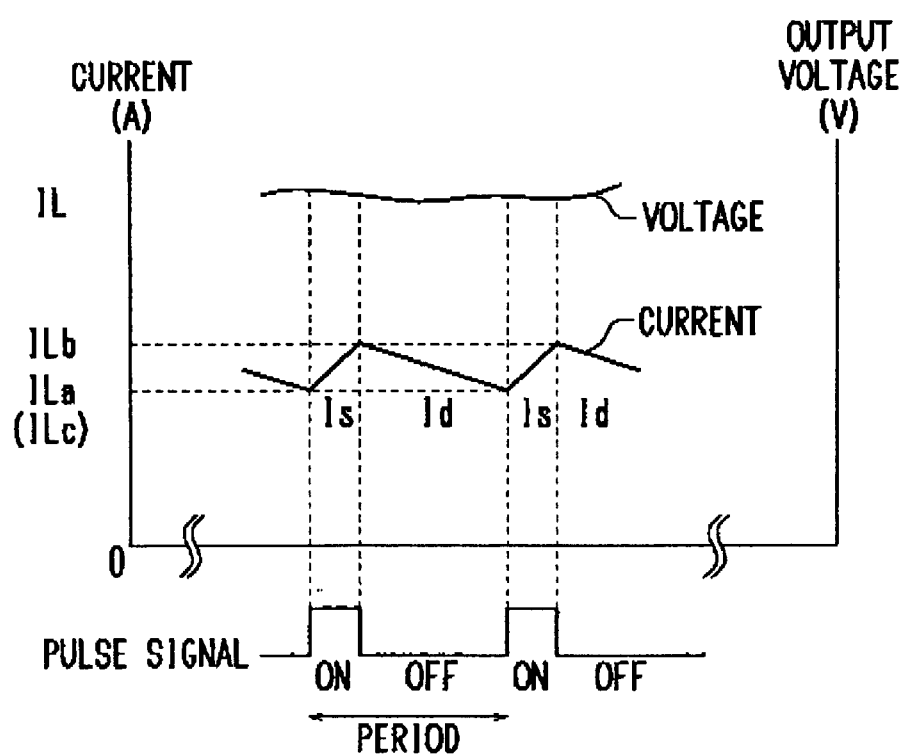
FIG. 6 is an explanatory diagram illustrating currents that flow in a voltage converting means main circuit, a voltage outputted therefrom and a pulse signal outputted therefrom.

A waveform of a current IL that flows in the reactor at this time, is shown in FIG. 6. The current IL that flows in the reactor 50 gradually increases from a nonzero current value ILa and starts to flow. After the current IL has assumed a maximum value ILb, it gradually decreases until a start time of a next cycle, thus resulting in a nonzero current value ILc. A current value at the start of the next cycle starts from the current value ILc.

By repeatedly performing the storage and emission of energy in the remaining state of energy in the reactor 50 used as the magnetic part in this way, the current continuously flows in the voltage converting mean main circuit 19a (current continuous mode).

When, in this case, the frequency of the pulse signal is excessively taken low or the duty thereof is excessively made small, the off time of the pulse signal becomes long. Therefore, when the switching part (Q) 51 is turned off, all of the magnetic energy stored in the reactor 50 are discharged. Thus, it is necessary to grasp such a frequency and duty as not to bring the energy of the reactor 50 into zero according to magnetic characteristics such as inductance and a B–H curve characteristic or the like of the reactor 50.

When the voltage converting means 19 is operated in such a current continuous mode, the voltage ripple of a post-boost output voltage is also low and vibrations of the motor-driven blower 6 are little produced either due to the voltage ripple. Thus, uncomfortable feeling due to the vibrations is not given to a user even when the user performs cleaning while getting a grip on the handle 8 and holding the electric vacuum cleaner.

A specific method of adjusting the frequency and duty of a pulse signal outputted from the voltage conversion control means 15 will next be described with reference to FIG. 7.

Figure 7:
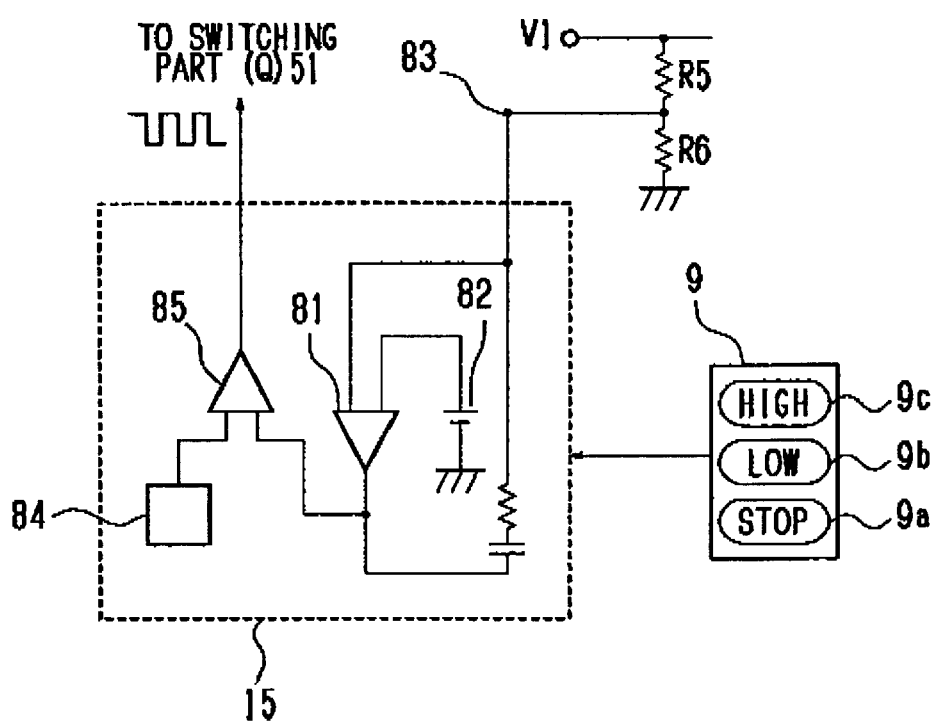
FIG. 7 is a circuit diagram depicting an example of a configuration of a voltage converting control means of the electric vacuum cleaner according to the embodiment of the present invention.

Referring to FIG. 7, the voltage conversion control means 15 is activated under the control of the operation mode switching control unit 9. In the voltage conversion control means 15, signals are respectively inputted to an error amplifier 81 from a reference voltage part 82 and an input voltage part 83. A signal outputted from the error amplifier 81 and a triangular wave signal oscillated from an oscillator 84 are inputted to a signal comparator 85. The oscillator 84, which allows the triangular wave signal to oscillate, is a method conventionally known per se. Further, a pulse signal is outputted from the signal comparator 85 to control the turning on/off of the switching part (Q) 51.

Here, the frequency of the triangular wave signal oscillated from the oscillator 84 can be suitably set to control the frequency of the pulse signal. Further, the suitable setting of a voltage V1 and a division ratio R5/R6 makes it possible to control the duty of the pulse signal.

Figure 8:
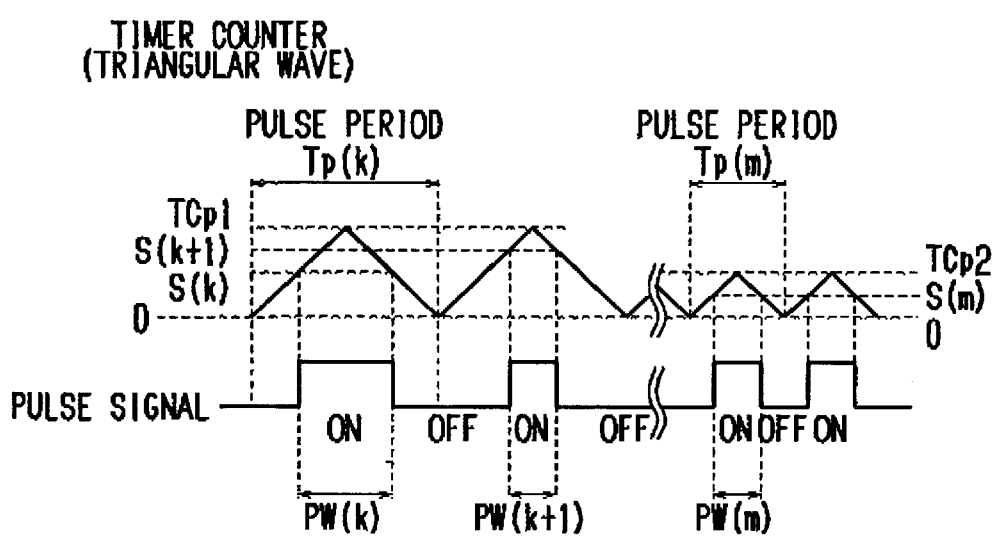
FIG. 8 is a timing chart showing a pulse signal and a triangular wave.

A method of controlling the frequency and duty of the pulse signal can be achieved even by a programming process of a microcomputer. The relationship between the frequency and duty of the triangular wave signal and those of the pulse signal both employed in the microcomputer is shown in FIG. 8 as a timing chart. The triangular wave signal is produced using a timer counter. A maximum value TCp1 of a counter value is set in an up/down counter mode, for example, so that the period Tp(k) of the pulse signal is obtained as follows:

$$Tp(k)=2\times TCp1\times \text{timer counter clock) [sec]}$$

Thus, the frequency fp(k) of the pulse signal is represented as follows:

$$fp(k)=1/(2\times TCp1\times \text{timer counter clock)[Hz]}$$

Further, a set value S(k) stored in the storage means 17 and the value of the timer counter are compared. When the timer counter value reaches greater than or equal to the set value S(k), the pulse signal is held on. Thus, a pulse width PW(k) [sec] is determined and hence duty Du(k) is represented as follows:

$$Du(k)=PW(k)/(2\times TCp1\times \text{timer counter clock) [\%]}$$

Thus, the frequency fp(k) and duty Du(k) of the pulse signal are controlled by changing the maximum value TCp1 of the timer counter value and the set value S(k).

Consequently, the control of at least one of the frequency and duty of the pulse signal makes it possible to bring the current flowing through the voltage converting means main circuit 19a to the current continuous mode as shown in FIGS. 7 and 8.

Controlling at least one of the frequency and duty of the pulse signal similarly allows control of the boost rate of the voltage converting means 19. For instance, the boost rate is rendered high by taking an increase in duty, and the boost rate is rendered low by taking a decrease in duty in reverse.

[Battery Identifying Means]

A battery identifying means will next be described. The value of a current flowing through the resistor R0 used as the identifying means 26 of the secondary battery 10a is detected by the electric vacuum cleaner control means 13. The type of the secondary battery 10a, e.g., a battery voltage, capacity (ampere-hour capacity, unit Ah), a battery property, etc. are identified. Further, the boost rate of the voltage converting means 19 is determined according to such identification information.

As a specific example, the voltage converting means 19 increases the boost rate in the case of a secondary battery 10a excellent in sustained performance of its output voltage, whereas the voltage converting means 19 reduces the boost rate in the case of a secondary battery 10a inexpensive and degraded in performance. As a result, even in the case of the secondary batteries 10a different in performance, similar performance can be obtained in terms of its service hour per charge. Further, the voltage converting means 19 decreases the boost rate in the case of a secondary battery 10a high in output voltage and raises the boost rate in the case of a secondary battery 10a low in output voltage. As a result, similar performance can be obtained even in the case of the secondary batteries 10a different in output voltage.

Thus, since the motor-driven blower 6 can flexibly be driven with respect to batteries different in battery voltage, capacity (ampere-hour capacity, unit Ah), battery property, etc., such as a nickel-cadmium (NiCd) battery, a nickel metal hydride battery, a lithium ion battery, etc. as the type of the secondary battery 10a, the DC power supply 10 can be replaced by another in accordance with intended uses of the electric vacuum cleaner 1. Further, since even a DC power supply 10 low in output voltage can drive the motor-driven blower 6 in association with its output voltage, the DC power supply 10 can be small-sized and reduced in weight, and the manufacturing cost thereof can be reduced.

Incidentally, the type of secondary battery 10a has been identified by the resistor R0 attached to the DC power supply 10 in the present embodiment. However, even when such a configuration that the secondary battery 10a is provided with a protrusion or the like and the type of the secondary battery 10a can be identified according to the position and form of the protrusion, or such a configuration that the output voltage of the DC power supply 10 is detected by the voltage converting means input voltage detecting portion 22 and the type of the secondary battery 10a can be identified based on the output voltage, is taken, operations and effects similar to the embodiment can be brought about. Further, the output voltage of the DC power supply 10 is detected by the voltage converting means input voltage detected portion 22. Further, the electric vacuum cleaner control means 13 detects information about the discharge of the secondary battery 10a from this voltage value, thereby determines the boost rate of the voltage converting means 19 and/or changes the operation mode from the boost operation mode to the non-boost operation mode according to the detected discharge information i.e., the remaining capacity of the secondary battery 10a.

As timing provided to determine the boost rate, there are known a method of detecting the output voltage of the DC power supply 10 in the boost operation mode and determining (changing) a boost rate based on the detected value of the output voltage, a method of detecting the output voltage of the DC power supply 10 upon deactivation of the electric vacuum cleaner 1 or in the non-boost operation mode and determining a subsequent boost rate in the boost operation mode based on the detected value of the output voltage, etc. As to the determination of the boost rate, table data and calculation equations have been stored in the storage means 17. The boost rate is determined according to the output voltage information at that time.

[Temperature Detecting Means For Battery]

Further, the thermistor 21 used as a temperature detecting part for detecting a temperature of the secondary battery 10a is provided in the neighborhood of the secondary battery 10a. The thermistor 21 varies in its resistance value according to a change in temperature. As one example of use of the thermistor 21, both ends of the thermistor 21 are connected to the electric vacuum cleaner control means 13. The electric vacuum cleaner control means 13 detects a change in the temperature of the neighborhood of the secondary battery 10a through the thermistor 21, determines the boost rate of the voltage converting means 19 according to a change in the resistance of the thermistor 21, and switches an operation mode from a boost operation mode to a deboost or non-boost operation mode. Described specifically, when, for example, the temperature of the secondary battery 10a becomes higher than the set temperature stored in the storage means 17, the electric vacuum cleaner control means 13 reduces the boost rate of the voltage converting means 19 and reduces the output current of the secondary battery 10a to thereby suppress a rise in the temperature of the secondary battery 10a. While the above description has shown, as an example, the case in which the thermistor has been used as the temperature detecting part, this can be realized similarly even in the case of the use of another method, e.g., a thermocouple.

While the secondary battery 10a changes in discharge characteristic according to its temperature, the degree of an influence of the temperature of the secondary battery 10a with respect to the service hour per charge can be lessened by changing the boost rate according to the temperature of the secondary battery 10a as described above. Owing to these viewpoints, the need for the mounting of a large secondary battery 10a is eliminated and the DC power supply 10 can be brought into less size and weight.

Further, the electric vacuum cleaner control means 13 detects the value of a current flowing through the resistor R0 and information about the temperature of the thermistor 21 respectively, and detects information about the discharge of the secondary battery 10a from these current value and temperature information. Thereby the electric vacuum cleaner control means 13 determines the boost rate of the voltage converting means 19 and/or switches the operation mode from the boost operation mode to the non-boost operation mode according to the detected discharge information, i.e., the remaining capacity of the secondary battery 10a. Described specifically, when the capacity that remains in the secondary battery 10a, becomes lower than the set value stored in the storage means 17, for example, the boost rate of the voltage converting means 19 is reduced.

Therefore, a consumption rate, i.e., a discharge rate of the capacity of the DC power supply 10 can be made slow. Thus, since it is easy to adjust the service hour of the secondary battery 10a per charge, the service hour can be ensured long with respect to various use histories subsequent to the charge of the electric vacuum cleaner 1. Further, the service hour per charge can be ensured long even with respect to a secondary battery 10a low in capacity. Owing to an abrupt increase in the output current of the secondary battery 10a, a sudden drop in the output voltage of the secondary battery 10a can also be prevented.

As timing provided to determine the boost rate, there are known a method of detecting the temperature of the secondary battery 10a in the boost operation mode and determining (changing) a boost rate based on the detected value of temperature, a method of detecting the temperature of the second battery 10a upon deactivation of the electric vacuum cleaner 1 or in the non-boost operation mode and determining a subsequent boost rate in the boost operation mode based on the detected value of temperature, etc. As to the determination of the boost rate, table data and calculation equations have been stored in the storage means 17. The boost rate is determined according to temperature information at that time.

[Temperature Detecting Means For Motor-Driven Blower]

Further, the electric vacuum cleaner control means 13 detects the temperature of the motor-driven blower 6 by a thermistor used as an unillustrated temperature detecting part attached to the motor-driven blower 6, and determines the boost rate of the voltage converting means 19 and/or switches the operation mode from the boost operation mode to the non-boost operation mode according to the detected temperature of the motor-driven blower 6. Described specifically, when the temperature of the motor-driven blower 6 rises higher than the set temperature stored in the storage means 17, for example, the electric vacuum cleaner control means 13 reduces the boost rate of the voltage converting means 19 and decreases a current flowing through the motor-driven blower 6 to thereby suppress a rise in temperature.

Therefore, since the rises in the temperatures of the motor-driven blower 6 and the voltage converting means main circuit 19a are suppressed, shortening of the life and degradation in reliability due to the temperatures of the motor-driven blower 6 and the voltage converting means main circuit 19a can be lessened.

As timing provided to determine the boost rate, there are known a method of detecting the temperature of the motor-driven blower 6 in the boost operation mode and determining (changing) a boost rate based on the detected value of temperature, a method of detecting the temperature of the motor-driven blower 6 upon deactivation of the electric vacuum cleaner 1 or in the non-boost operation mode and determining a subsequent boost rate in the boost operation mode based on the detected value of temperature, etc. As to the determination of the boost rate, table data and calculation equations have been stored in the storage means 17. The boost rate is determined according to temperature information at that time.

[Temperature Detecting Means For Voltage Converting Means Main Circuit 19a]

Further, the electric vacuum cleaner control means 13 detects the temperature of the voltage converting means main circuit 19a by a thermistor used as an unillustrated temperature detecting part attached to the magnetic part 50, switching part (Q) 51, counter-flow preventive part 52 or capacitor 53 or the like, on the substrate of the voltage converting means main circuit 19a, and determines the boost rate of the voltage converting means 19 and/or switches the operation mode from the boost operation mode to the non-boost operation mode according to the detected temperature of the the voltage converting means main circuit 19a. Described specifically, when the temperature of the voltage converting means main circuit 19a rises higher than the set temperature stored in the storage means 17, for example, the electric vacuum cleaner control means 13 lowers the boost rate of the voltage converting means 19.

Therefore, the current that flows in the voltage converting means main circuit 19a, is reduced and hence the rise in the temperature of the voltage converting means main circuit 19a is suppressed. Thus, it is possible to lessen life shortening and degradation in reliability of the magnetic part 50 such as the reactor, the switching part (Q) 51 using the semiconductor switching element such as the MOSFET, bipolar transistor or IGBT or the like, the counter-flow preventive part 52 (diode) for preventing the counterflow of the energy, the capacitor 53 corresponding to the capacitive impedance part element, etc. Accordingly, both a reliability enhancement and a life extension of the electric vacuum cleaner 1 can be realized.

Since the respective parts constituting the voltage converting means main circuit 19a, such as the switching part (Q) 51, diode 52, reactor 50 and capacitor 53 or the like can be prevented from rising in temperature, they can be reduced in current capacity. As a result, these respective parts can be downsized and reduced in weight.

As timing provided to determine the boost rate, there are known a method of detecting the temperature of the voltage converting means main circuit 19a in the boost operation mode and determining (changing) a boost rate based on the detected value of temperature, a method of detecting the temperature of the voltage converting means main circuit 19a upon deactivation of the electric vacuum cleaner 1 or in the non-boost operation mode and determining a subsequent boost rate in the boost operation mode based on the detected value of temperature, etc. As to the determination of the boost rate, table data and calculation equations have been stored in the storage means 17. The boost rate is determined according to temperature information at that time.

As described above, owing to the temperature detecting part mounted inside the body case 2 of the electric vacuum cleaner, the temperatures of the DC power supply 10, the motor-driven blower 6 and the voltage converting means main circuit 19a are detected and the boost rate is determined (changed) based on the detected values, thereby suppressing a change in the service hour per charge for the secondary battery 10a, ensuring the length of the service hour and preventing the shortening of the life and the degradation in reliability or the like, thus making it possible to realize enhancements of the reliability and life of the electric vacuum cleaner 1. The temperature of a motor (not shown) for a floor brush, which has been built in the inlet body 3 as a location other than the interior of the body case 2 of the electric vacuum cleaner, is detected. Consequently, it is also possible to prevent the shortening of life and degradation in reliability or the like due to its temperature rise and enhance the reliability of the electric vacuum cleaner 1.

[Timer]

An example of the form of usage of the timer 18 will next be described. As one example of the use form of the timer means 18, the electric vacuum cleaner control means 13 measures a drive time of the motor-driven blower 6 in the boost operation mode. When the drive time is over the set time stored in the storage means 17, the electric vacuum cleaner control means 13 reduces the boost rate of the voltage converting means 19 or switches the operation mode from the boost operation mode to the non-boost operation mode. Further, the electric vacuum cleaner control means 13 measures a drive time of the motor-driven blower 6 in the non-boost operation mode and determines a subsequent boost rate in the boost operation mode according to the drive time. Determination of the boost rate is stored in the storage means 17. It is therefore possible to suppress rises in the temperatures of the motor-driven blower 6, the voltage converting means main circuit 19a and the DC power supply 10 in the boot operation mode large in power consumption of the secondary battery 10a.

Thus, it is possible to prevent life shortening and reliability degradation of these motor-driven blower 6 and voltage converting means main circuit 19a, and suppress a change in the service hour per charge due to a change in the discharge characteristic of the secondary battery 10a. Thus, the reliability of the electric vacuum cleaner 1 is enhanced and the service hour per charge is easily ensured.

Since it is possible to prevent the rises in the temperatures of the respective parts that constitute the voltage converting means main circuit 19a, such as the switching part (Q) 51, the diode 52, the reactor 50 and the capacitor 53 or the like, the respective parts can be reduced in current capacity. As a result, these individual parts can be downsized and reduced in weight.

Now consider as another example of the use form of the timer means 18 where a continuous operating time in a boost operation mode has exceeded the set time stored in the storage means 17 or the like. When, in this case, the state of a non-boost operation mode or a stop mode elapses more than the set time stored in the storage means 17 and the temperature in the electric vacuum cleaner 1 is not lowered, the electric vacuum cleaner 1 is driven so as not to be capable of operation in the boost operation mode again.

Thus, the reliability of the electric vacuum cleaner 1 can be enhanced and the respective parts can be downsized and reduced in weight.

When the continuous operating time in the boost operation mode has exceeded the set time stored in the storage means 17 or the like, such an operation form to automatically perform switching to the non-boost operation mode is taken to thereby allow an operator to strongly recognize that large power is required in the boost operation mode, whereby unnecessary power consumption of the DC power supply 10 can be suppressed and the service time or hour per charge for the second battery 10a can be prevented from shortening.

As yet another example of the use form of the timer means 18, the electric vacuum cleaner control means 13 estimates the capacity that remains in the secondary battery 10a, based on information about the drive times of the motor-driven blower 6 measured in the boost operation mode and the non-boost operation mode of the electric vacuum cleaner 1, and determines a subsequent boost rate in the boost operation mode. When the drive time is longer than the set value stored in the storage means 17 or the like, for example, the electric vacuum cleaner control means 13 estimates that the capacity that remains in the secondary battery 10a is low, and thereby reduces the boost rate of the voltage converting means 19. It is therefore possible to easily adjust the service hour per charge for the secondary battery 10a. Thus, even if the use histories of the electric vacuum cleaner 1 subsequent to the charge of the secondary battery 10a lies in variety, the service hour can be ensured. As to the determination of the boost rate, table data and calculation equations have been stored in the storage means 17, and hence the boost rate is determined according to drive time information at that time.

As still yet another example of the use form of the timer means 18, the electric vacuum cleaner control means 13 measures a post-charge elapsed time, estimates the state of discharge of the secondary battery 10a from the elapsed time and determines a subsequent boost rate in the boost operation mode. As to the determination of the boost rate, a method similar to the above is taken.

[Operation Mode Switching Control Unit]

Figure 9:
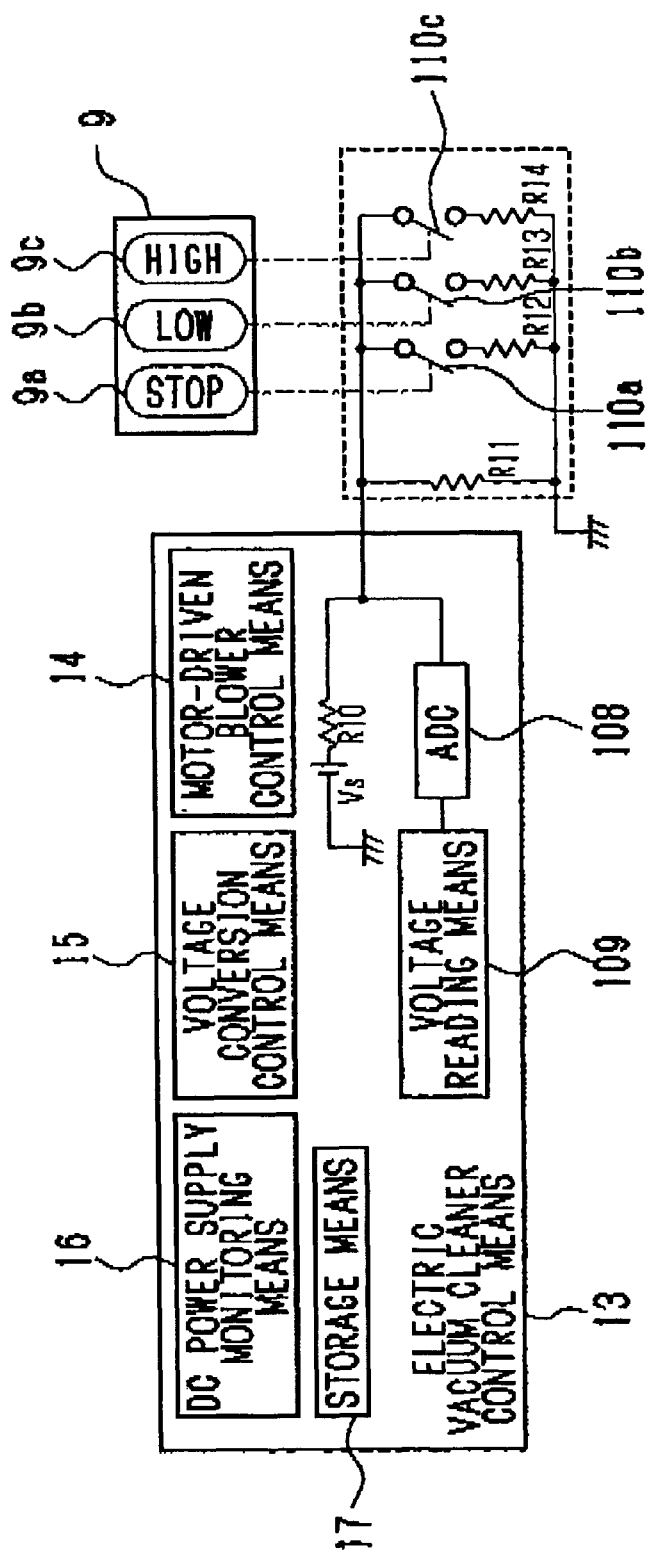
FIG. 9 is a circuit diagram of an operation mode switching control unit of the electric vacuum cleaner according to the embodiment of the present invention.

A specific configuration and operation of the operation mode switching control unit 9 will next be described with reference to FIG. 9.

In the electric vacuum cleaner control unit 13, a voltage-divided value of a reference voltage Vs is set so as to change according to the state of operation of the operation mode switching control unit 9. The so-changed divided value is converted into a digital signal by an ADC 108 corresponding to an analog-digital converter, which is thereafter read by a voltage reading means 109.

As a circuit configuration (voltage variable circuit) for changing the voltage-divided value of the reference voltage Vs according the operation state of the operation mode switching control unit 9, a circuit configuration is provided wherein switches 110a, 110b and 110c switched according to the operation of control buttons 9a, 9b and 9c of the operation mode switching control unit 9 while a voltage capable of being detected between a resistor R10 and a resistor R11 is being inputted to the ADC 108, are provided for the operation mode switching control unit 9, and resistors R12, R13 and R14 different in resistance value from one another are connected in parallel with a resistor R11 according to the state of switching between the switches 110a, 110b and 110c.

A control program or a control value or the like corresponding to each voltage value read by the voltage reading means 109 according to the operation of the low-operation setting control button 9*b* in the operation mode switching control unit 9 is stored in a storage means 17 provided within the electric vacuum cleaner control means 13.

Further, a control program or a control value or the like corresponding to each voltage value read by the voltage reading means 109 according to the operation of the high-operation setting control button 9*c* in the operation mode switching control unit 9 is stored in the storage means 17 in a manner similar to the above.

Thus, the operation mode switching control unit 9 is capable of selecting and setting a plurality of voltages, and the voltage reading means 109 reads each voltage set by the operation mode switching control unit 9. Consequently, switching is performed between a plurality of electric vacuum cleaner operation modes according to the read voltage. It is therefore possible to realize the addition of each operation mode at low cost without adding signal lines between the operation mode switching control unit 9 and the ADC 108.

[Operation]

Driving operations of the electric vacuum cleaner 1 according to the present embodiment will now be described together with the operation of the voltage converting means 19 with reference to FIG. 10.

In the electric vacuum cleaner 1 held in a stop or halt state, the low-operation setting control button 9*b* is operated at a time T0 so that the switching part 12*a* performs switching to the DC power supply 10 side to input a voltage outputted from the secondary battery 10*a* to the motor-driven blower 6, thereby driving the electric vacuum cleaner 1 in a low output state.

Next, the high-operation setting control button 9*c* is operated at a time T1 so that the switching part 12*a* performs switching to the voltage converting means 19. Further, a pulse signal is outputted to the switching part (Q) 51 to activate the voltage converting means 19. Thereafter, an output voltage boosted by the voltage converting means 19 is inputted to the motor-driven blower 6, thereby driving the electric vacuum cleaner 1 in a high output state. This high output operation mode corresponds to a maximum output operation mode of the operation modes prepared for the electric vacuum cleaner 1. In the case of such an operation mode, the electric vacuum cleaner 1 is highest in dust suction power and the secondary battery 10*a* increases in power consumption as well.

Incidentally, a process for controlling the switching operations of the switching part 12*a* and the switching part (Q) 51 constitutes. a switching means for selecting any one of the output voltage of the DC power supply 10 and the output voltage boosted by the voltage converting means 19 together with the switching part 12*a* and the switching part (Q) 51.

According to the present embodiment, however, when the high-operation setting control button 9*c* is operated, the output voltage boosted by the voltage converting means 19 is supplied to the motor-driven blower 6. Therefore, a non-boost operation mode is set in a low operation mode of operation modes of "low" and "high" of the electric vacuum cleaner 1, whereas a boost operation mode is set in a high operation mode of the operation modes of "low" and "high" of the electric vacuum cleaner 1. In this sense, the low-operation setting control button 9*b* functions as a control part for selecting the non-boost operation mode, and the high-operation setting control button 9*c* functions as a control part for selecting the non-boost operation mode. The stop button 9*a* functions as a stop control part for stopping rotational driving of the motor-driven blower 6.

Figure 10:
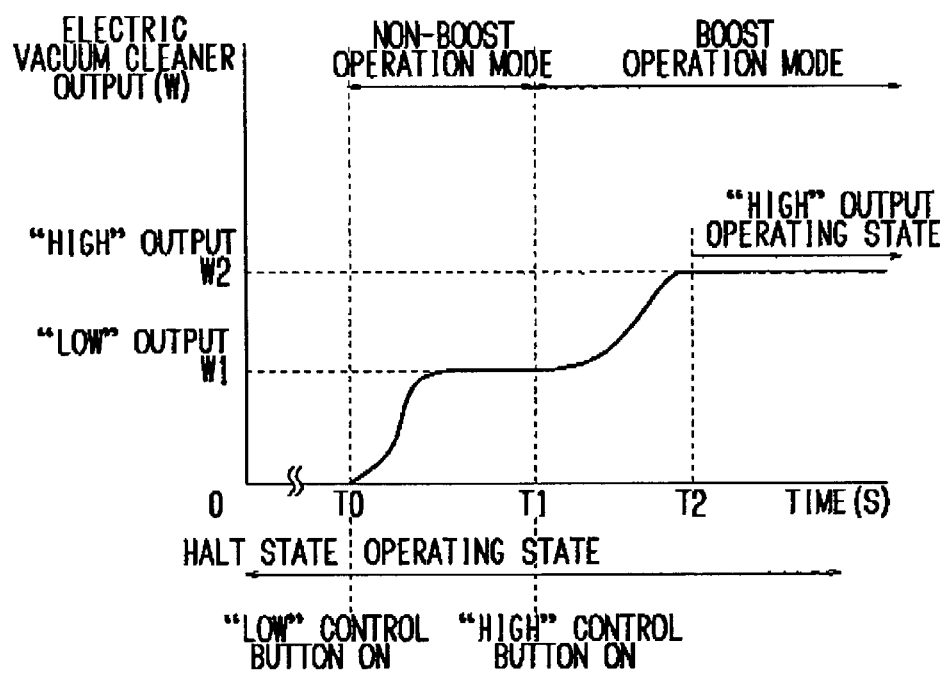
FIG. 10 is an explanatory diagram illustrating one example of operation control for the electric vacuum cleaner according to the embodiment of the present invention.

Incidentally, the above description based on FIG. 10 has been made by the example in which the low-operation setting control button 9*b* and the high-operation setting control button 9*c* are successively operated from the halt state. Therefore, it shows the example in which the operation mode has been changed from the non-boost operation mode to the boost operation mode. However, when the high-operation setting control button 9*c* is operated at once in the halt state, the operation mode is directly changed from the halt state to the boost operation mode.

Thus, the non-boost operation mode for supplying the output voltage of the DC power supply 10 to the motor-driven blower 6 and the boost operation mode for supplying the output voltage obtained by boosting the output voltage of the DC power supply 10 to the motor-driven blower 6 are prepared in advance, and the switching means for performing switching between these operation modes and the operation mode switching control unit for operating the switching means are provided, whereby a user is able to directly carry out such switching in person.

When the electric vacuum cleaner needs dust suction power in a large output, for example, it is necessary to use a battery having large capacity or boost a source voltage by such a voltage converting means as described above in the invention of the present application for the purpose of an increase in the output of the motor-driven blower.

The method using the battery having the large capacity is accompanied by drawbacks that since the motor-driven blower is directly driven by the battery, the power circuit per se is extremely low in power loss but the battery increases in size and weight, thus resulting in an increase in the size of the electric vacuum cleaner and the occurrence of trouble upon its use and carrying or the like. Since the electric vacuum cleaner is always equipped with a large battery even when no required to have the dust suction power so far, trouble similar to the above occurs.

On the other hand, a drawback arises in that since power losses due to the circuit parts or the like that constitute a voltage converting circuit, are produced when the source voltage is boosted by the voltage converting means, needless power must be unavoidably used as compared with the case where it is driven directly by the battery.

However, a feature is brought about in that when a power unit can be greatly reduced in size and weight as compared with the case where the capacity of the battery is increased.

When the voltage of the battery is boosted by the voltage converting means and the voltage converting means is configured so as to normally operate, the voltage converting means is used even when the user is in no need of high dust suction power, thus producing losses of power by the voltage converting circuit and shortening the service hour of the battery. When the battery is a secondary battery, its service hour per charge becomes short.

Such a configuration that the user is able to directly select the operation mode for the electric vacuum cleaner in accordance with the use forms peculiar to the electric vacuum cleaner, i.e., the degree of dust suction power desired by the user or the degree of the length of its service hour per charge in view of the above-described requirements, is greatly effective for the user.

Namely, as in the configuration of the present invention, means for driving the motor-driven blower based on the output voltage of the battery alone (non-boost operation mode), which is used as one for the case where the dust suction power is not so required or it is desired to make long the service hour (service hour per charge in the case of the secondary battery) of the battery, and means for driving the motor-driven blower based on the output voltage boosted by the voltage converting means (boost operation mode), which is used as one for the case where the high dust suction power is required, are provided as output control means for the motor-driven blower. There is further provided switching means capable of performing switching between these output control means when necessary. Consequently, the user is able to select the corresponding operation mode according to user's various situations.

Thus, the electric vacuum cleaner can be reduced in size and weight owing to the use of such a configuration. Simultaneously, since the boost operation mode can be operated only when the high dust suction power is required, the loss of power by the use of the voltage converting means can be controlled to the required minimum.

Since a cordless type electric vacuum cleaner mentioned as one use form of the electric vacuum cleaner according to the invention of the present application with the DC power supply as the drive source is small in size and light in weight and has convenience that the boost operation mode can be used only when required, it is suitable for its use in particular.

[Example of Another Configuration of Control Circuit]

Figure 11:
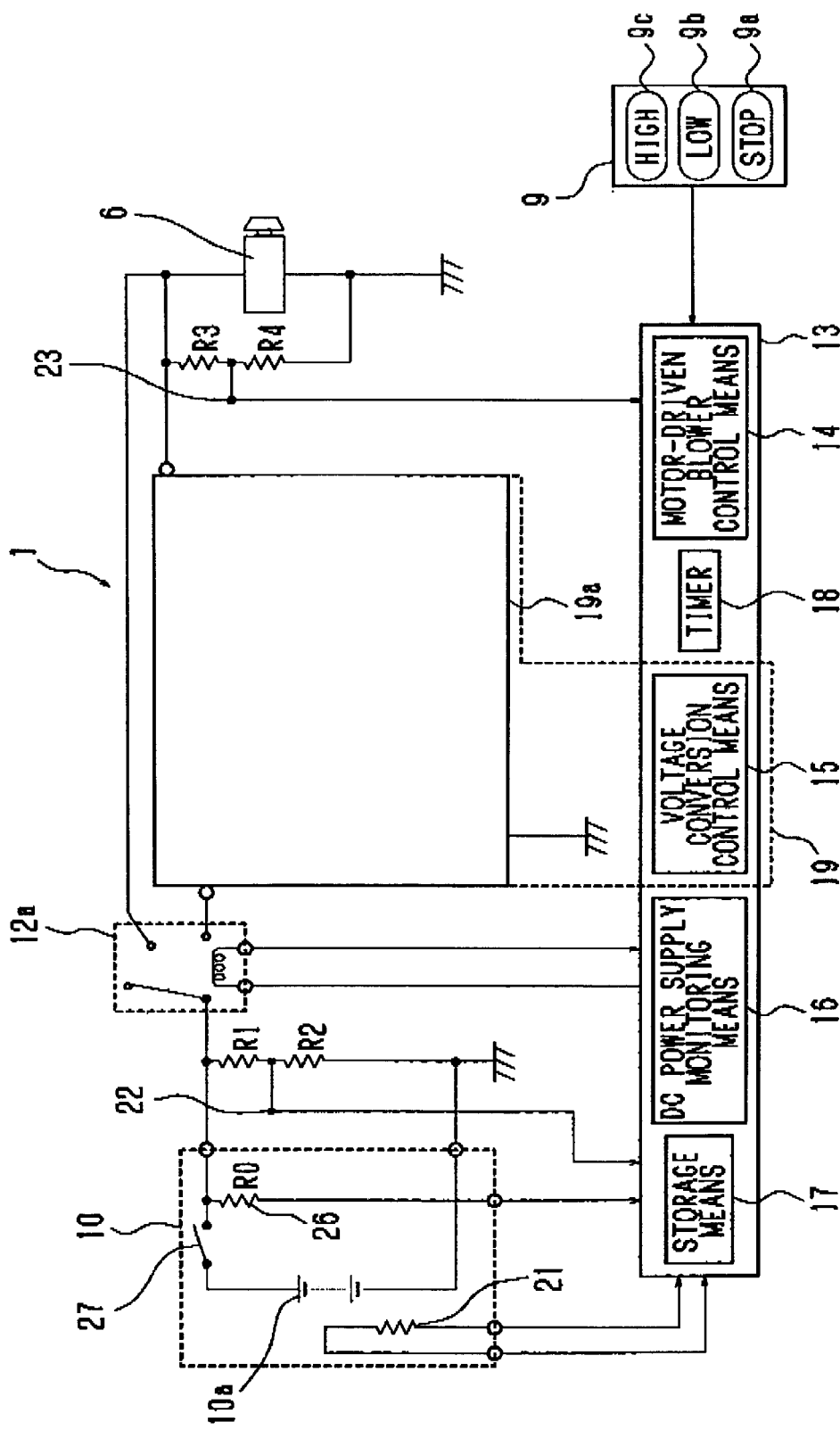
FIG. 11 is a circuit diagram depicting another example of the control circuit of the electric vacuum cleaner according to the embodiment of the present invention.

Another control circuit for the motor-driven blower 6 in the electric vacuum cleaner 1 is next shown in FIG. 11. The control circuit shown in FIG. 11 is different from the control circuit shown in FIG. 3 in that a switching part 12b is placed in a stage prior to a voltage converting means main circuit 19a. The switching part 12b performs an operation similar to the switching part 12a of the control circuit shown in FIG. 3. Namely, the switching part 12b functions as a switching means.

[Example of Further Configuration of Control Circuit]

Figure 12:
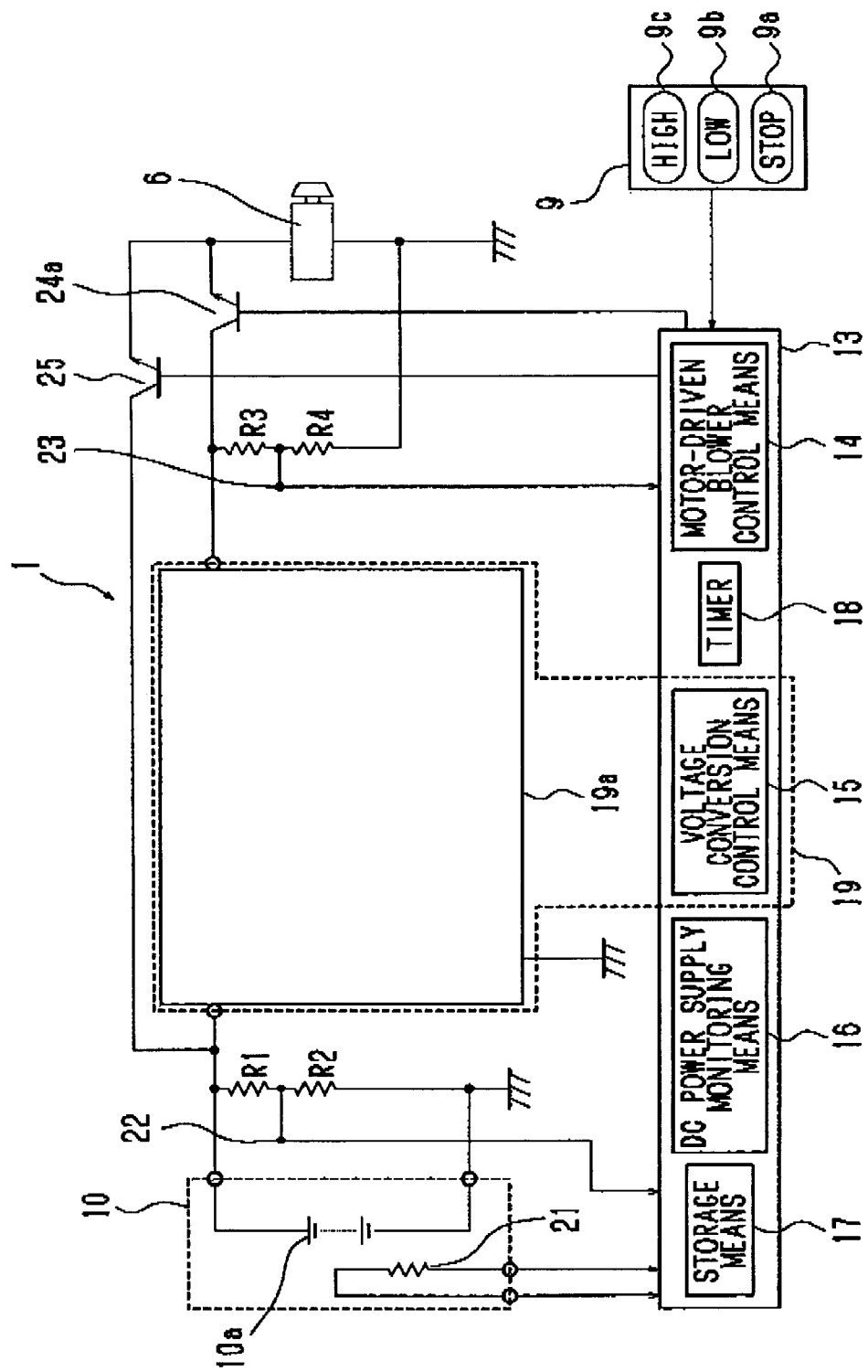
FIG. 12 is a circuit diagram showing a further example of the control circuit of the electric vacuum cleaner according to the embodiment of the present invention.

A further control circuit for the motor-driven blower 6 in the electric vacuum cleaner 1 is next shown in FIG. 12. In the control circuit shown in FIG. 12, a switching part (A) 24a and a switching part 25 corresponding to two switching parts are disposed as a switching means as an alternative to the switching part 12a. The motor-driven blower 6 is connected to a voltage converting means main circuit unit 19a through the switching part (A) 24a and connected to a DC power supply 10 through the switching part 25. These switching parts (A) 24a and 25 are switched by a motor-driven blower control means 14 to thereby change the input source of the motor-driven blower 6. It is needless to say that these switching parts (A) 24a and 25 can be implemented not only by semiconductor switching elements such as a bipolar transistor, etc. but also by switching parts such as the electromagnetic relay. Since, however, the semiconductor switching elements such as the bipolar transistor, etc. can be switched at high speed in low power, they are so suitable for a battery-operated electric vacuum cleaner as switching parts.

The control circuit shown in FIG. 12 is capable of isolating the motor-driven blower 6 on a circuitry basis with the switching part (A) 24a and the switching part 25 even if a problem such as a failure occurs in the motor-driven blower 6. Therefore, a large current can be prevented from flowing even if, for example, a short-circuit failure occurs in the motor-driven blower 6, whereby the DC power supply 10 and the voltage converting means main circuit 19a can be protected.

[Example of Further Configuration of Control Circuit]

Figure 13:
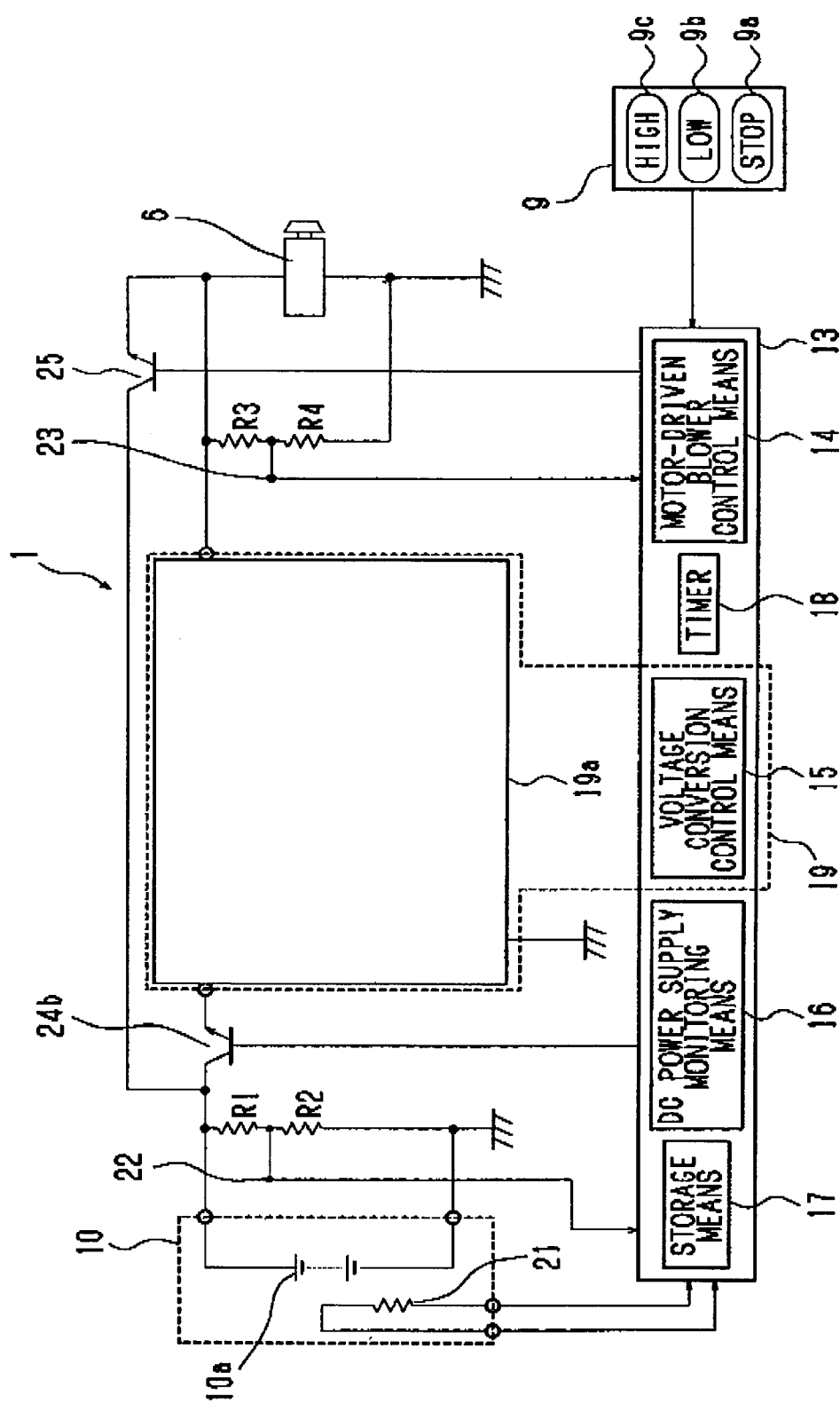
FIG. 13 is a circuit diagram illustrating a still further example of the control circuit of the electric vacuum cleaner according to the embodiment of the present invention.

A still further control circuit for the motor-driven blower 6 in the electric vacuum cleaner 1 is shown in FIG. 13. The present control circuit is different from the control circuit shown in FIG. 12 in that a DC power supply 10 and a voltage converting means main circuit 19a are connected via a switching part (A) 24b. Thus, the switching part (A) 24b and a switching part 25 are switched by a motor-driven blower control means 14 to change the input source of the motor-driven blower 6.

When the switching part (A) 24b is turned off in the control circuit shown in FIG. 13 when the electric vacuum cleaner 1 is not in use, no reactive current flows in the voltage converting means main circuit 19a and less reactive power consumption is provided. Further, since the DC power supply 10 can be isolated on a circuitry basis by the switching part (A) 24b and the switching part 25 even if a problem such as a failure occurs in the DC power supply 10, the motor-driven blower 6 and the voltage converting means main circuit 19a can be protected.

[Example of Still Further Configuration of Control Circuit]

Figure 14:
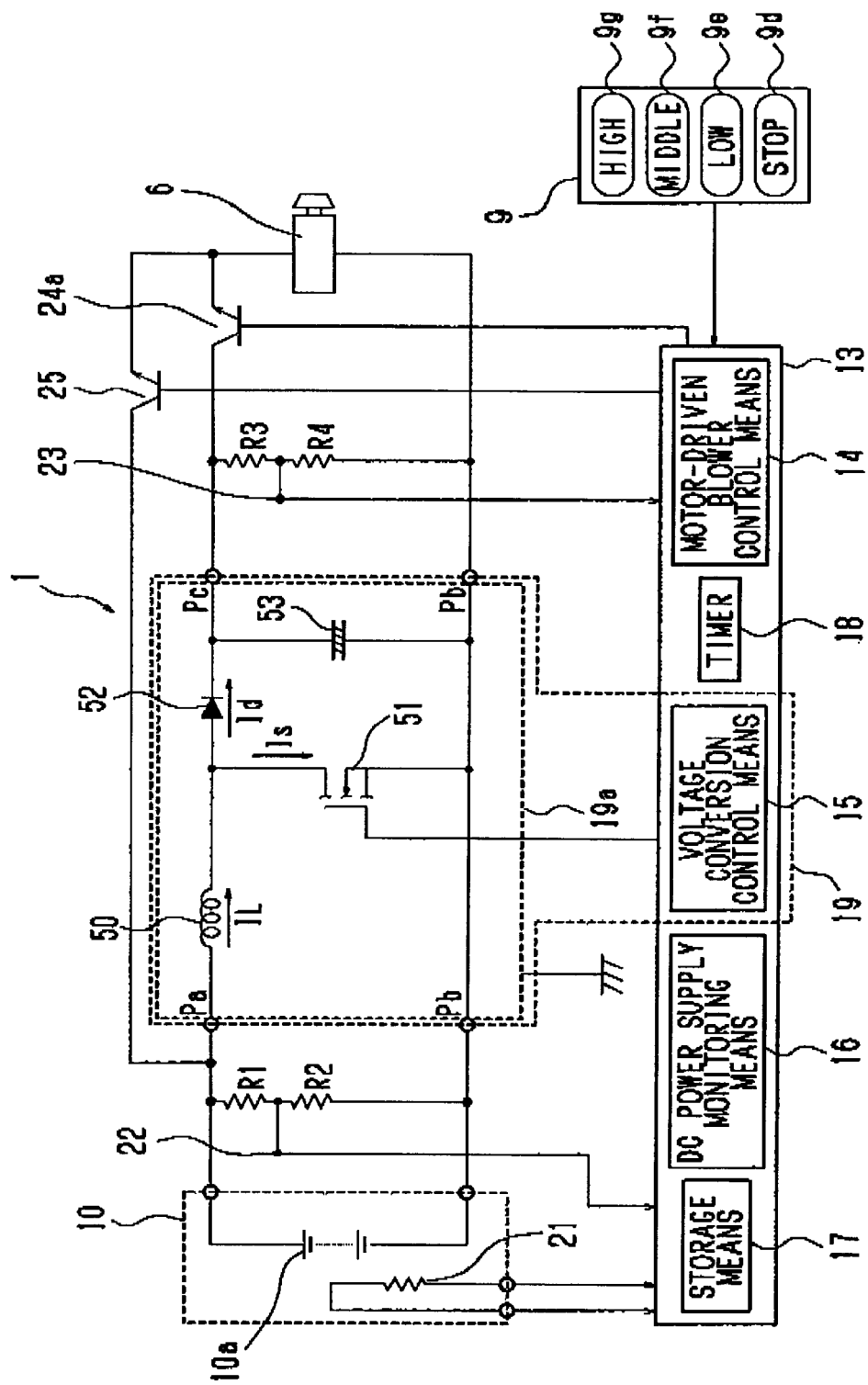
FIG. 14 is a circuit diagram depicting a still further example of the control circuit of the electric vacuum cleaner according to the embodiment of the present invention.

A still further control circuit for the motor-driven blower 6 in the electric vacuum cleaner 1 is next shown in FIG. 14. The present control circuit is one wherein the voltage converting means 19 shown in FIG. 4 is applied as the voltage converting means 19 of the control circuit shown in FIG. 12. Another control button is additionally provided in the operation mode switching control unit 9.

The operation of the electric vacuum cleaner 1 at the time that a low-operation setting control button 9e, a middle-operation setting control button 9f and a high-operation setting control button 9g in the operation mode switching control unit 9 are operated in the control circuit shown in FIG. 14, will be described in detail with reference to FIG. 15 together with the operations of a switching part (Q) 51, a switching part (A) 24a and a switching part 25 as switching means.

When the low-operation setting control button 9e is first operated in the electric vacuum cleaner 1 being in a halt state, the motor-driven blower control means 14 outputs an on/off signal and thereby the switching part 25 is repeatedly turned on and off based on the signal. Thus, the motor-driven blower 6 starts to rotate and hence the output of the electric vacuum cleaner 1 rises from a zero output to a preset low operation mode output W4. The output of the motor-driven blower 6 can be adjusted based on duty of a pulse signal or the like.

When the middle-operation setting control button 9f is operated from this state, the motor-driven blower control means 14 outputs a pulse signal large in duty as compared with the low operation mode and thereby the switching part 25 is repeatedly turned on and off based on the signal, whereby the output of the electric vacuum cleaner 1 is raised to a preset middle operation mode output W6.

Thus, when the low-operation setting control button 9e or the middle-operation setting control button 9f is operated, the switching part (A) 24a and the switching part (Q) 51 are deactivated and hence an output voltage boosted by the voltage converting means 19 is not supplied to the motor-driven blower 6.

Further, when the high-operation setting control button 9g is operated from this state, the switching part 25 is turned off and thereafter the switching part (A) 24a is turned on. Further, the voltage conversion control means 15 outputs a pulse signal to the switching part (Q) 51. Consequently, the voltage converting means main circuit 19a is operated so that a voltage outputted from a secondary battery 10a is boosted via the voltage converting means main circuit 19a, followed by application to the motor-driven blower 6. Thus, the output voltage of the voltage conversion means 19 is supplied to the motor-driven blower 6, where the output thereof is raised to a preset high operation mode output W8.

The high output operation mode for the output W8 is a maximum output operation mode of operation modes prepared for the electric vacuum cleaner 1 and provides the highest dust suction power in the electric vacuum cleaner 1.

Incidentally, a process for controlling the switching operations of the switching part (Q) 51, the switching part (A) 24a and the switching part 25 constitutes a switching means for selecting any one of the output voltage of the DC power supply 10 and the output voltage boosted by the voltage converting means 19 together with the switching part (Q) 51, the switching part (A) 24a and the switching part 25.

According to the present embodiment, however, when the high-operation setting control button 9g is operated, the output voltage of the voltage converting means 19 is supplied to the motor-driven blower 6. Therefore, a non-boost operation mode is set in a low or middle operation mode of general operation modes of "low", "middle" and "high" of the electric vacuum cleaner 1, whereas a boost operation mode is set in a high operation mode of the general operation modes of "low", "middle" and "high" of the electric vacuum cleaner 1. In this sense, the low-operation setting control button 9e and the middle-operation setting control button 9f function as a control part for selecting the non-boost operation mode, and the high-operation setting control button 9g functions as a control part for selecting the boost operation mode, The stop button 9d functions as a stop control part for stopping rotational driving of the motor-driven blower 6.

Figure 15:
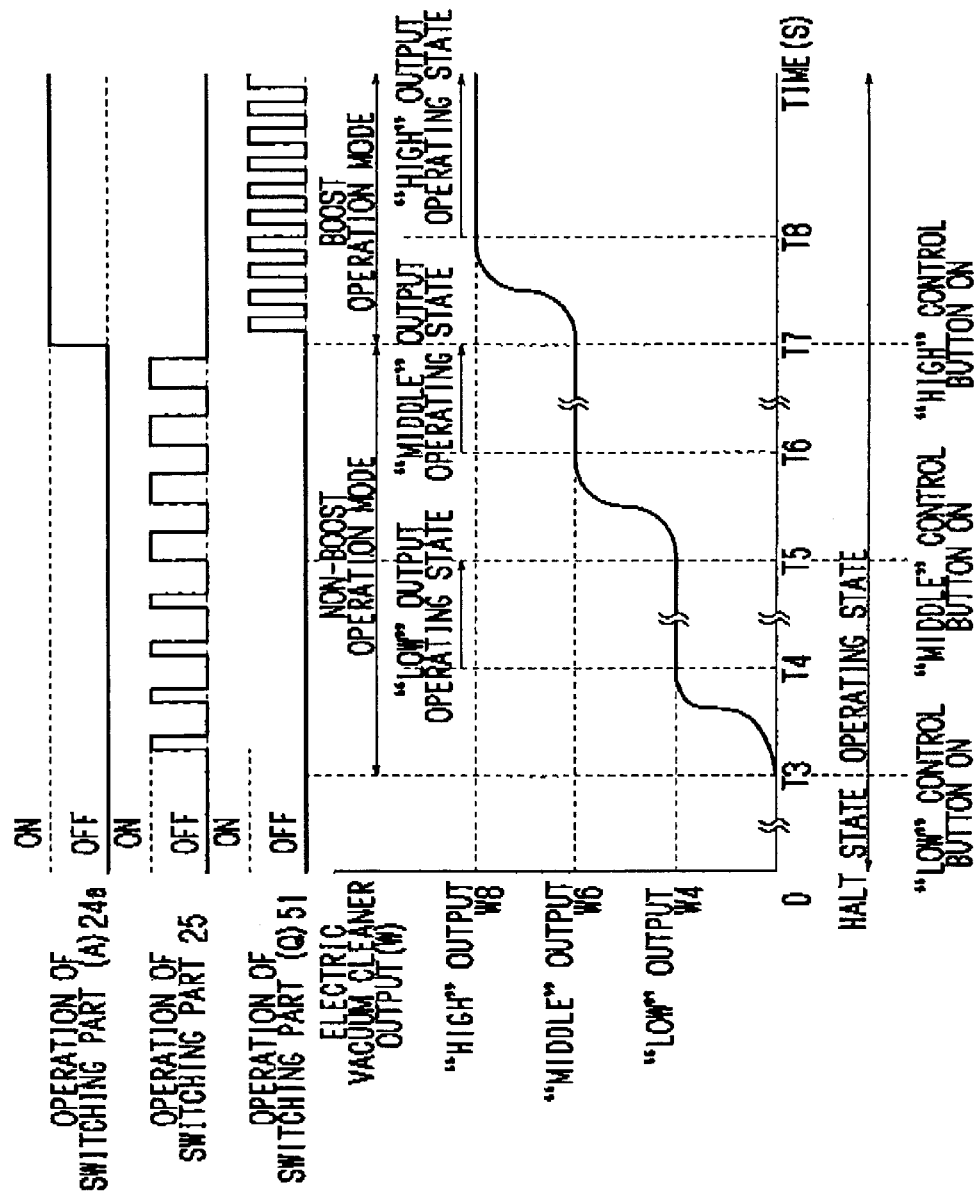
FIG. 15 is an explanatory diagram showing another example of the operation control of the electric vacuum cleaner according to the embodiment of the present invention.

Incidentally, the above description based on FIG. 15 has been made by the example in which the low-operation setting control button 9e, the middle-operation setting control button 9f and the high-operation setting control button 9g are successively operated from the halt state. Therefore, it shows the example in which the operation mode has been changed from the non-boost operation mode to the boost operation mode. However, when the high-operation setting control button 9g is operated immediately in the halt state, the operation mode is directly changed from the halt state to the boost operation mode.

Figure 16:
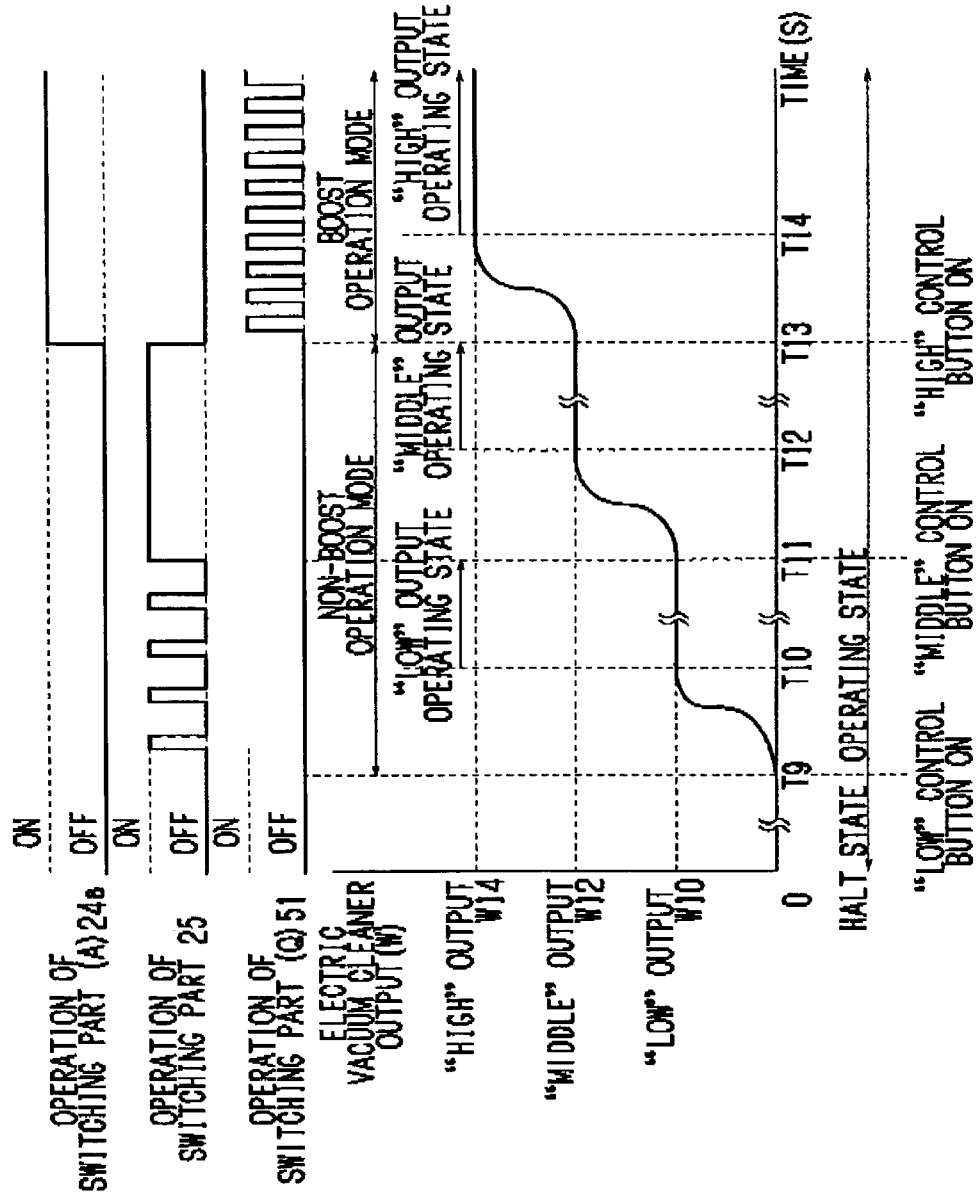
FIG. 16 is an explanatory diagram depicting a further example of the operation control of the electric vacuum cleaner according to the embodiment of the present invention.

An example of another operation of the electric vacuum cleaner 1 where the operation mode switching control unit 9 is operated in the control circuit shown in FIG. 14, will next be described in detail with reference to FIG. 16. In the present example, the operation of the switching part 25 in the middle operation mode is different from the example of the operation shown in FIG. 15. In the example shown in FIG. 15, the switching part 25 is repeatedly turned on and off based on the on/off signal outputted from the motor-driven control means 14 in the middle operation mode. In the example shown in FIG. 16 on the other hand, a pulse signal indicative of normally on (duty: 100%) is outputted from the motor-driven blower control means 14 on the middle operation mode, and the switching part 25 performs a normally-on operation based on the signal. In either case, however, no on signal is outputted to the switching part (Q) 51 and the voltage converting means 19 is deactivated.

The switching part (A) 24a is a part capable of directly controlling the supply of the output voltage boosted by the voltage converting means 19 to the motor-driven blower. Operating states of the switching part (A) 24a in the boost operation mode are given two types. One of them corresponds to an operating state in which the switching part repeats on/off operations, whereas the other thereof corresponds to an operating state in which the switching part is held on. The operation example shown in FIG. 15 is common to the operation example illustrated in FIG. 16 in that the switching part (A) 24a is held on based on the signal outputted from the motor-driven blower control means 14 in the boost operation mode.

When the switching part (A) 24a is brought into an on/off operating state in the boost operation mode in the control circuit shown in FIG. 14, the switching part (Q) 51 is also in an operating state in which it repeats on/off operations. Therefore, the ripple of a voltage inputted to the motor-driven blower 6 becomes large, thus leading to vibrations and noise. Thus, the state of operation of the switching part (A) 24a in the boost operation mode is controlled to a normally-on state, thereby providing an electric vacuum cleaner easy to use for the user.

[Boost Operation Mode Start Operation]

A procedure for performing a start operation of the boost operation mode in the control circuit shown in FIG. 14 will next be described with reference to FIG. 17. A switching start operation of the switching part (A) 24a is controlled so as to take earlier than a switching start operation of the switching part (Q) 51 when the high-operation setting control button 9g is operated in the halt state. Owing to the execution of such control, the operation mode is transitioned to the boost operation mode after the transition of the non-boost operation mode. Thus, since the voltage converting means main circuit 19a is not operated in an unloaded condition, it does not lead to an unstable state that the voltage boosted by the voltage converting means 19 becomes abnormally high, thus enabling a safety and stable operation of the voltage converting means 19.

When the power inputted to the motor-driven blower 6 changes, vibrations and noise of the motor-driven blower 6 are produced due to its change. The vibrations give uncomfortable feeling to a user particularly when the user is cleaning with the handle 8. However, the power inputted to the motor-driven blower 6 becomes large stepwise according to the execution of a sequence that the operation mode is shifted to the boost operation mode after the transition of the non-boost operation mode. Thus, since the degree of a change in the power inputted to the motor-driven blower 6 upon the start of the boost operation mode is relaxed, the vibrations and noise of the motor-driven blower 6 can be lessened.

Further, a problem arises in that when large power is suddenly inputted to the motor-driven blower 6 upon start of the driving of the electric vacuum cleaner 1 where such a dust collection system as shown in FIG. 2 is utilized which causes air to rotate tornadically and separates dust and air by centrifugal force, air lying within the dust cup 13 is disturbed, so that the effect of separating the dust and air from each other is weakened, and the dust or the like collected within the dust cup are raised up, so that the speed of contaminating the prefilter 33 is made fast. However, owing to the adoption of the sequence that the operation mode is shifted to the boost operation mode after the transition of the non-boost operation mode, the power inputted to the motor-driven blower 6 becomes large stepwise and these problems become no pronounced.

Combining the above method with control for gradually increasing a boost rate is much more effective.

[Boost Operation Mode Stop Operation]

Figure 18:
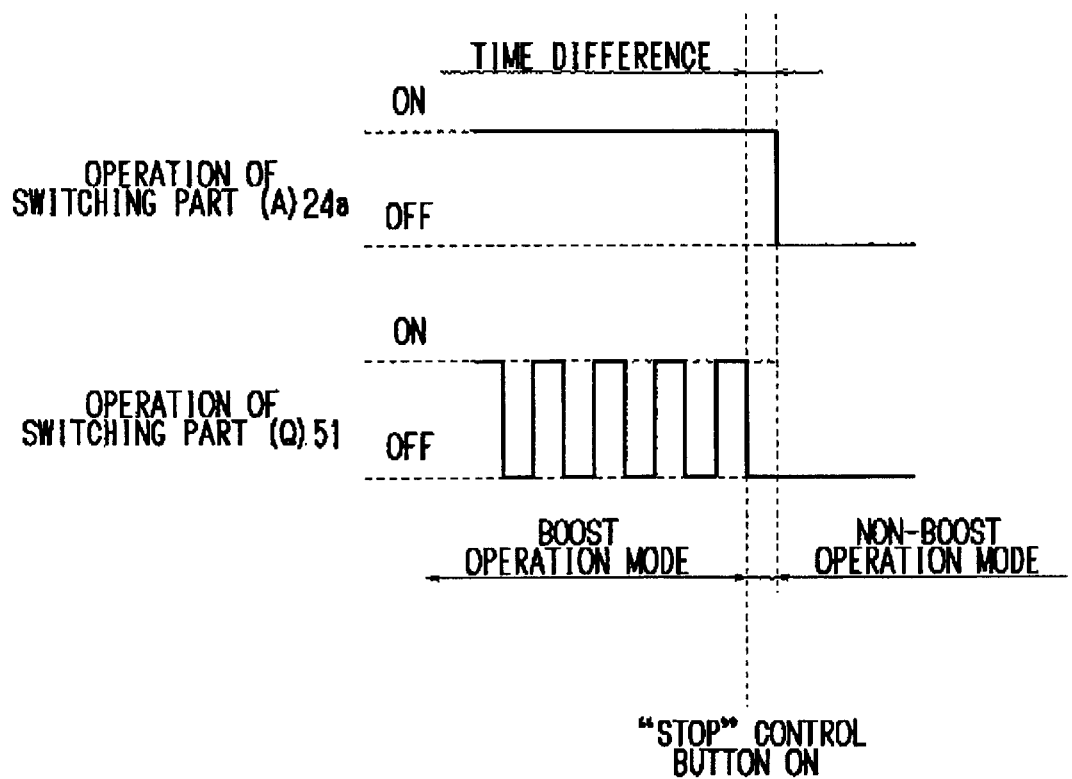
FIG. 18 is an explanatory diagram depicting one example of operation control at the stop of the boost operation mode of the electric vacuum cleaner.

A procedure for performing a stop operation of the boost operation mode in the control circuit shown in FIG. 14 will next be described with reference to FIG. 18. As shown in FIG. 18, a switching stop operation of the switching part (Q) 51 is made earlier than a switching stop operation of the switching part (A) 24a even when the stop button 9d is operated in the boost operation mode. Owing to the execution of a sequence that the operation mode passes the non-boost operation mode after the stop of the boost operation mode, the voltage converting means main circuit 19a is not operated in an unloaded condition. Therefore, the present circuit does not lead to an unstable state that the voltage boosted by the voltage converting means 19 becomes abnormally high, thus enabling a safety and stable operation thereof.

[Example of Still Further Configuration of Control Circuit]

Figure 19:
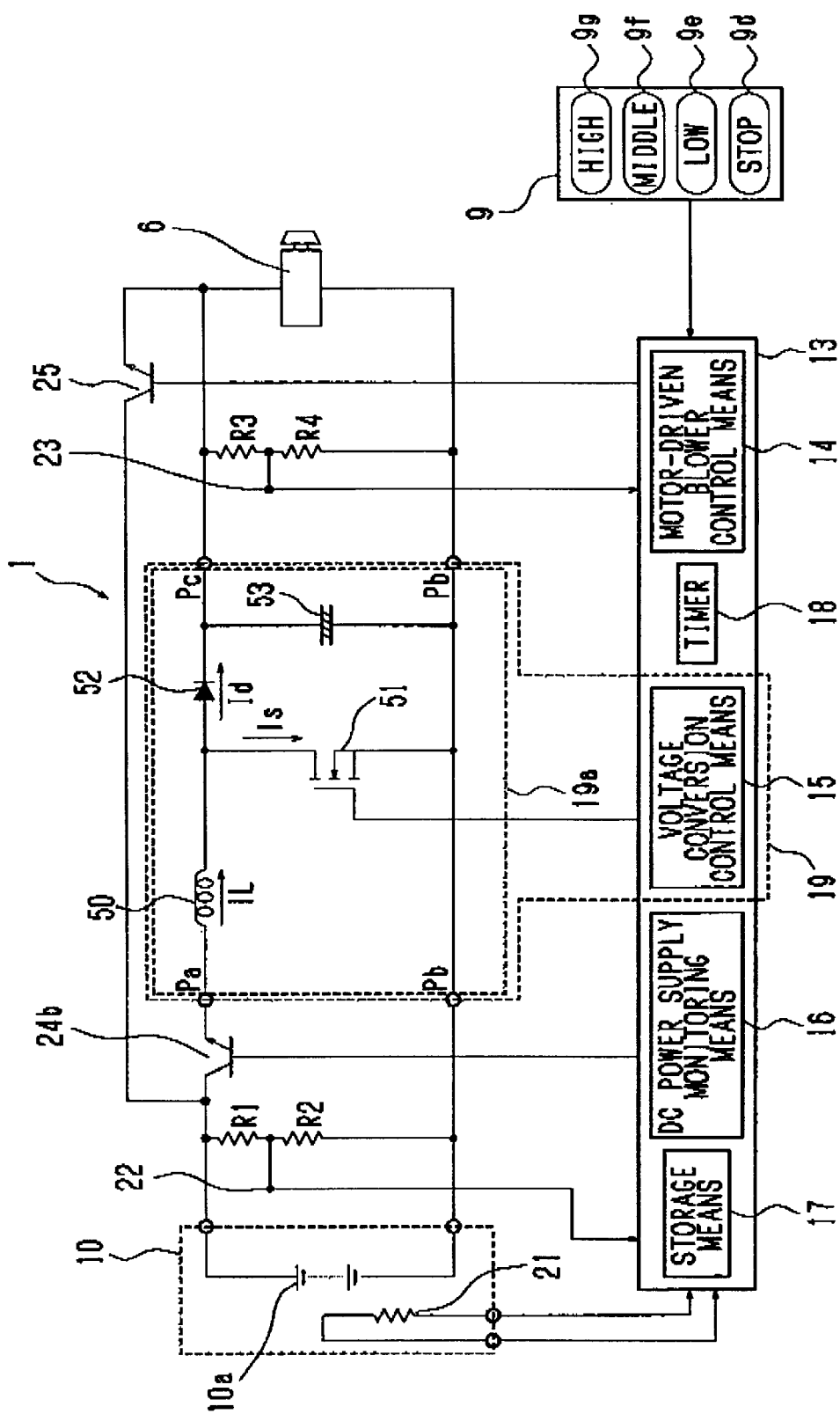
FIG. 19 is a circuit diagram showing a still further example of the control circuit of the electric vacuum cleaner according to the embodiment of the present invention.

A still further control circuit for the motor-driven blower 6 in the electric vacuum cleaner 1 is next shown in FIG. 19. The present control circuit is one in which the voltage converting means 19 shown in FIG. 4 is applied as the voltage converting means 19 of the control circuit shown in FIG. 13. A switching part (A) 24b shown in FIG. 19 is a part capable of directly controlling the supply of an output voltage boosted by the voltage converting means 19 to the motor-driven blower. The switching part (A) 24b performs an operation similar to the switching part (A) 24a shown in FIG. 14. Thus, the electric vacuum cleaner 1 performs such operations as shown in FIGS. 15 and 16. Thus, the switching part (A) 24b also functions as a switching means.

When the switching part (A) 24b is brought into an on/off operating state inn the boost operation mode in the control circuit shown in FIG. 19, the timing provided to bring a voltage inputted to the voltage converting means 19 into zero takes place. Thus, a pulse signal inputted to a switching part 51 (Q) greatly varies in duty, and hence a voltage converting operation becomes unstable. Accordingly, the state of operation of the switching part 24b in the boost operation mode is controlled to a normally-on state.

Incidentally, a process for controlling the switching operations of the switching part (Q) 51, the switching part (A) 24b and the switching part 25 constitutes a switching means for selecting any one of a voltage outputted from a DC power supply 10 and the output voltage of the voltage converting means 19 together with the switching part (Q) 51, the switching part (A) 24b and the switching part 25.

[Boost Operation Mode Start Operation]

A procedure for performing a start operation of the boost operation mode in the control circuit shown in FIG. 19 will next be described with reference to FIG. 17. A switching start operation of the switching part (A) 24b is controlled so as to take earlier than a switching start operation of the switching part (Q) 51 when the high-operation setting control button 9g is operated in the halt state. Owing to the execution of such control, the operation mode is transitioned to the boost operation mode after the transition of the non-boost operation mode. Thus, since the timing in which the voltage converting means main circuit 19a is operated in an input voltage zero state, is not provided, the state in which the duty of the pulse signal to the switching part 51 (Q) becomes unstable, can be avoided, whereby the voltage converting means 19 is operated in safety and stably.

When the power inputted to the motor-driven blower 6 changes, vibrations and noise of the motor-driven blower 6 are produced due to its change. The vibrations give uncomfortable feeling to a user particularly when the user is cleaning with the handle 8. However, the power inputted to the motor-driven blower 6 becomes large stepwise according to the execution of a sequence that the operation mode is shifted to the boost operation mode after the transition of the non-boost operation mode. Thus, since the degree of a change in the power inputted to the motor-driven blower 6 upon the start of the boost operation mode is relaxed, the vibrations and noise of the motor-driven blower 6 can be lessened.

Further, a problem arises in that when large power is suddenly inputted to the motor-driven blower 6 upon start of the operation of the electric vacuum cleaner 1 where such a dust collection system as shown in FIG. 2 is utilized which causes air to rotate tornadically and separates dust and air by centrifugal force, air lying within the dust cup 13 is disturbed, so that the effect of separating the dust and air from each other is weakened, and the speed of raising up the dust or the like collected within the dust cup to thereby contaminate the prefilter 33 is made fast. However, owing to the adoption of the sequence that the operation mode is shifted to the boost operation mode after the transition of the non-boost operation mode, the power inputted to the motor-driven blower 6 becomes large stepwise and these problems become no pronounced.

[Boost Operation Mode Stop Operation]

A procedure for performing a stop operation of the boost operation mode in the control circuit shown in FIG. 18 will next be described with reference to FIG. 18. As shown in FIG. 18, a switching stop operation of the switching part (Q) 51 is made earlier than a switching stop operation of the switching part (A) 24b even when the stop button 9d is operated in the boost operation mode. Owing to the use of a sequence that the operation mode passes the non-boost operation mode after the stop of the boost operation mode, the timing in which the voltage converting means main circuit 19a is operated in an input voltage zero state, is not provided. Thus, the state in which the duty of the pulse signal to the switching part 51 (Q) becomes unstable, can be avoided, whereby the voltage converting means 19 is operated in safety and stably.

[Example of still further configuration of control circuit]

Figure 20:
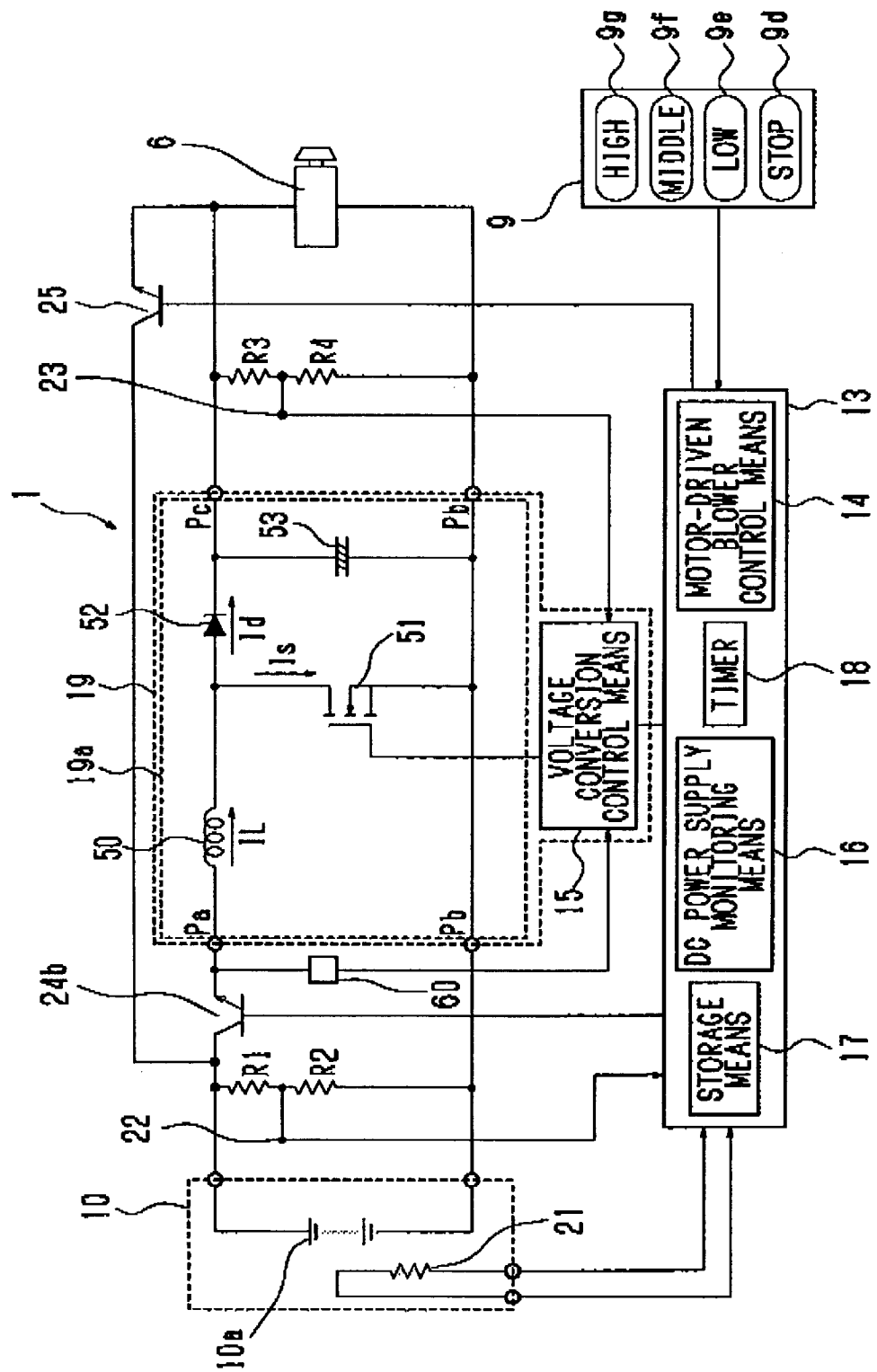
FIG. 20 is a circuit diagram illustrating a still further example of the control circuit of the electric vacuum cleaner according to the embodiment of the present invention.

A still further control circuit for the motor-driven blower 6 in the electric vacuum cleaner 1 is next shown in FIG. 20. As shown in FIG. 20, a voltage converting control means 15 for pulse-controlling a switching (Q) 51 and a motor-driven blower control means 14 for controlling a switching part (A) 24b are separated so as to be driven in discrete power supplies. A voltage from a drive power supply 60 for a voltage conversion control means is supplied from the motor-driven blower 6 side rather than from the switching part (A) 24b.

Figure 17:
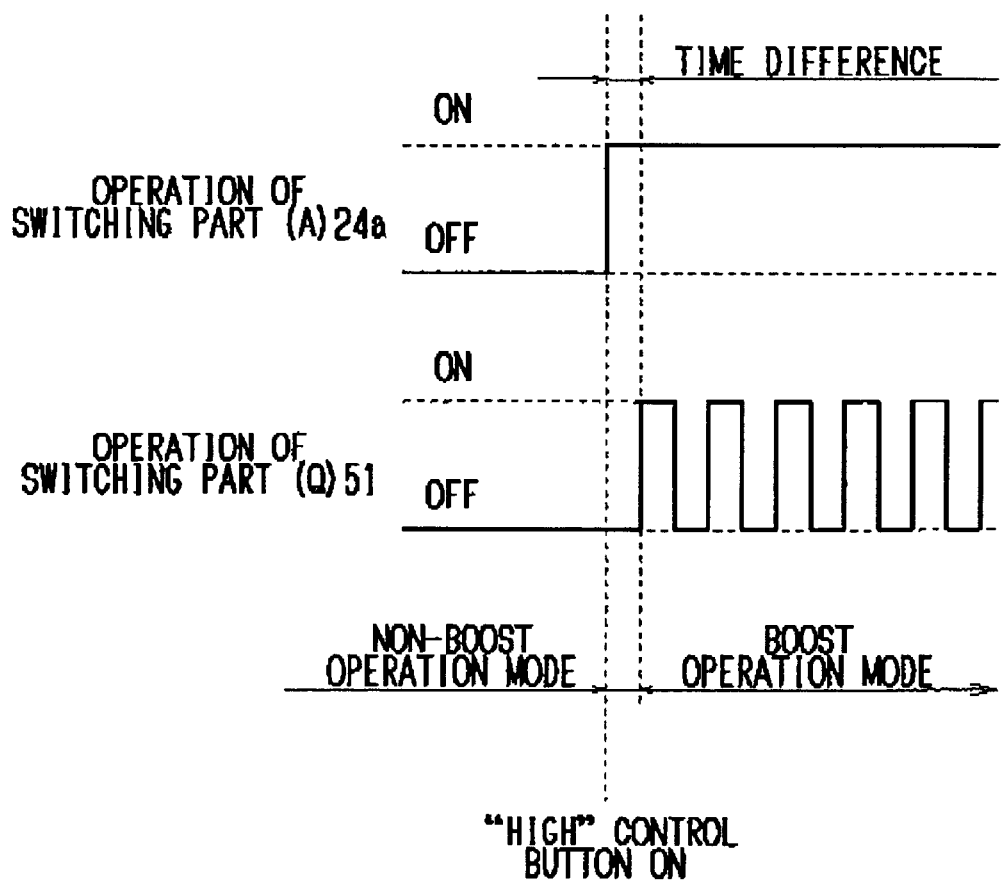
FIG. 17 is an explanatory diagram illustrating one example of operation control at the start of a boost operation mode of the electric vacuum cleaner.

Since a voltage converting means 19 is not operated owing to the adoption of such a configuration unless the switching part (A) 24b is in an on state, the setting of the start operation sequence in the boost operation mode shown in FIG. 17 becomes easy. Thus, since timing in which a voltage converting means main circuit 19a is operated in an input voltage zero state, is not provided, such an unstable state that a pulse signal to the switching part (Q) 51 abnormally increases in duty, can be avoided, whereby the voltage converting means 19 is operated in safety and stably. In the present control circuit, the switching part (A) 24b in the boost operation mode is controlled to a normally-on.

Since the drive power supply 60 is disposed on the motor-driven blower 6 side as viewed from the switching part (A) 24b, no reactive power is consumed by the drive power supply 60 if the switching part (A) 24b is turned off when the electric vacuum cleaner 1 is not in use. It is thus possible to effectively use power charged in a secondary battery 10a.

[Example of Still Further Configuration of Control Circuit]

Figure 21:
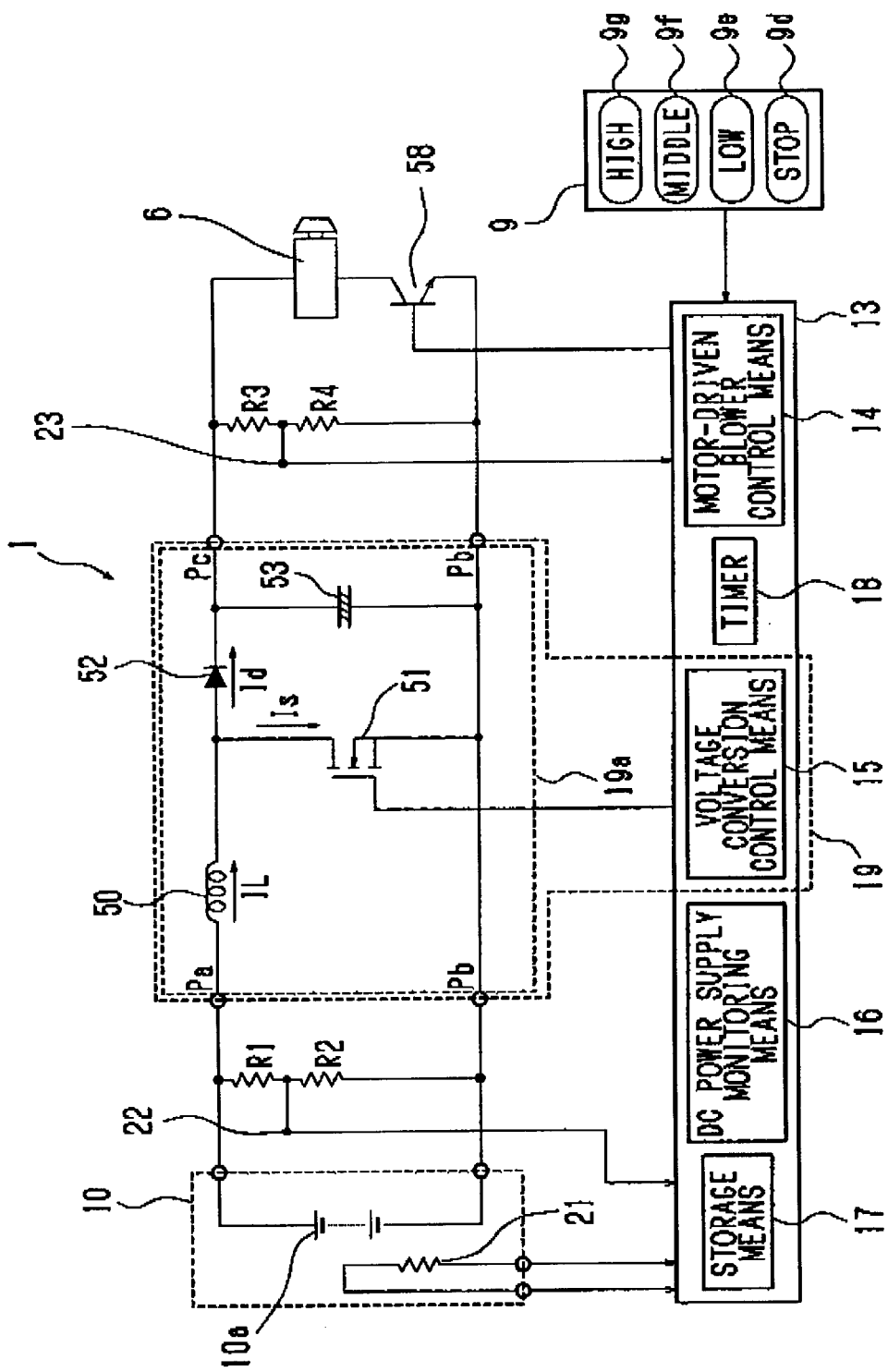
FIG. 21 is a circuit diagram showing a still further example of the control circuit of the electric vacuum cleaner according to the embodiment of the present invention.

A still further control circuit for the motor-driven blower 6 in the electric vacuum cleaner 1 is next shown in FIG. 21.

In the control circuit shown in FIG. 21, a switching part (A) 58 used as a switching means is provided on the low voltage side of the motor-driven blower 6 as a switching part (A). There is not provided a bypass path for directly connecting a DC power supply 10 and the motor-drive blower 6. It is needless to say that the switching part (A) 58 can be implemented not only by semiconductor switching elements such as a MOSFET, a bipolar transistor or an IGBT, etc. but also by switching parts such as the electromagnetic relay. Since, however, the semiconductor switching elements such as the MOSFET, bipolar transistor or IGBT, etc. can be switched at high speed in power lower than the electromagnetic relay, they are so suitable for a battery-operated electric vacuum cleaner as switching parts.

The operation of the electric vacuum cleaner 1 at the time that a low-operation setting control button 9e, a middle-operation setting control button 9f and a high-operation setting control button 9g in an operation mode switching control unit 9 of the control circuit shown in FIG. 21 are operated, will be described in detail with reference to FIG. 22 together with the operations of a switching part (Q) 51 and a switching part (A) 58.

When the low-operation setting control button 9e is first operated in the electric vacuum cleaner 1 being in a halt state, the motor-driven blower control means 14 outputs an on/off signal and thereby the switching part (A) 58 repeats on/off operations based on the signal respectively. Thus, the motor-driven blower 6 starts to rotate, and hence the output of the electric vacuum cleaner 1 rises from a zero output to a preset low operation mode output W34.

When the middle-operation setting control button 9f is operated from this state, the motor-driven blower control means 14 outputs a signal having a high proportion of an on time as compared with on a low operation mode and thereby the switching part (A) 58 is repeatedly turned on and off based on the signal, whereby the output of the electric vacuum cleaner 1 is raised to a preset middle operation mode output W36.

Thus, when the low-operation setting control button 9e or the middle-operation setting control button 9f is operated, the voltage converting means 19 is deactivated and hence an output voltage boosted via a voltage converting means main circuit 19a is not supplied to the motor-driven blower 6.

Further, when the high-operation setting control button 9g is operated from this state, the switching part (A) 58 remains unchanged and the voltage conversion control means 15 outputs a pulse control signal to the switching part (A) 51. Consequently, the voltage converting means main circuit 19a is activated so that a voltage outputted from a secondary battery 10a is boosted via the voltage converting means main circuit 19a, followed by application to the motor-driven blower 6. Thus, the output voltage of the voltage converting means 19 is supplied to the motor-driven blower 6 and thereafter the output of the motor-driven blower 6 is raised to a preset high operation mode output W38. The high output operation mode for the output W38 is a maximum output operation mode of operation modes prepared for the electric vacuum cleaner 1 and provides high power consumption and the highest dust suction power.

The switching part (A) 58 performs an operation similar to the switching part (A) 24a under the boost operation mode start procedure shown in FIG. 17 and the boost operation mode end procedure shown in FIG. 18, thus obtaining a similar effect.

A further example of the operation of the electric vacuum cleaner 1 at the time that the operation mode switching control unit 9 in the control circuit shown in FIG. 21 is operated, will next be described in detail with reference to FIG. 23. In the present example, the operation of the switching part (A) 58 in the high operation mode is different from the operation example shown in FIG. 22. In the operation example shown in FIG. 22, the switching part (A) 58 is repeatedly turned on and off according to an on/off signal outputted from the motor-driven blower control means 14 on the high operation mode. In the example shown in FIG. 23 on the other hand, the motor-driven blower control means 14 outputs a pulse signal indicative of normally on (duty: 100%) upon the high operation mode, and hence the switching part (A) 58 performs a normally on operation based on the signal, respectively.

A still further example of the operation of the electric vacuum cleaner 1 where the operation mode switching control unit 9 of the control circuit shown in FIG. 21, will next be described in detail with reference to FIG. 24. In the present example, the operation of the switching part (A) 58 in the middle operation mode is different from the operation example shown in FIG. 23. In the operation example shown in FIG. 23, the switching part (A) 58 repeats on/off operations according to an on/off signal outputted from the motor-driven blower control means 14 on the middle operation mode. In the example shown in FIG. 24 on the other hand, the motor-driven blower control means 14 outputs a pulse signal indicative of normally on (duty: 100%) upon the middle operation mode, and hence the switching part (A) 58 performs a normally on operation based on the signal, respectively. In either case, however, no on signal is outputted to the switching part (Q) 51 and the voltage converting means 19 is deactivated.

Figure 22:
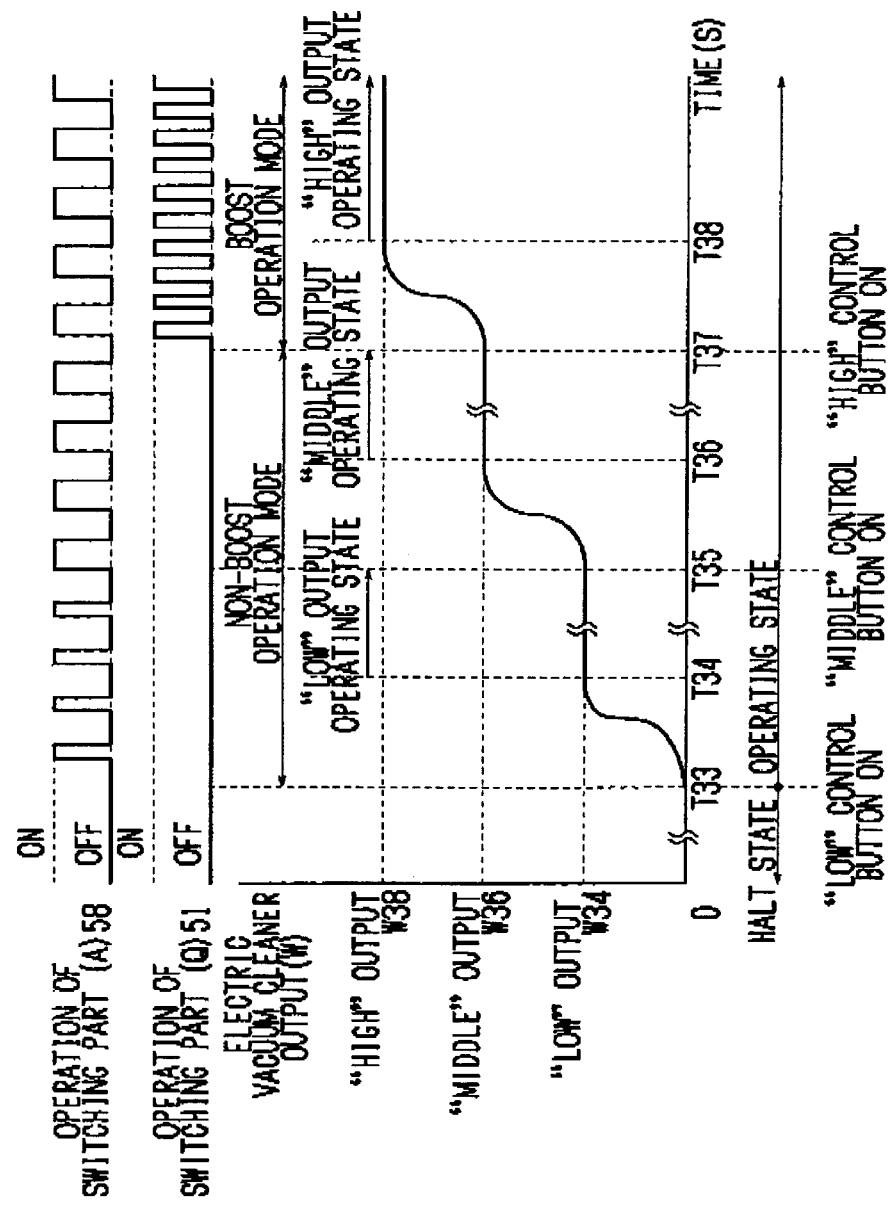
FIG. 22 is an explanatory diagram depicting a still further example of the operation control of the electric vacuum cleaner according to the embodiment of the present invention.
Figure 23:
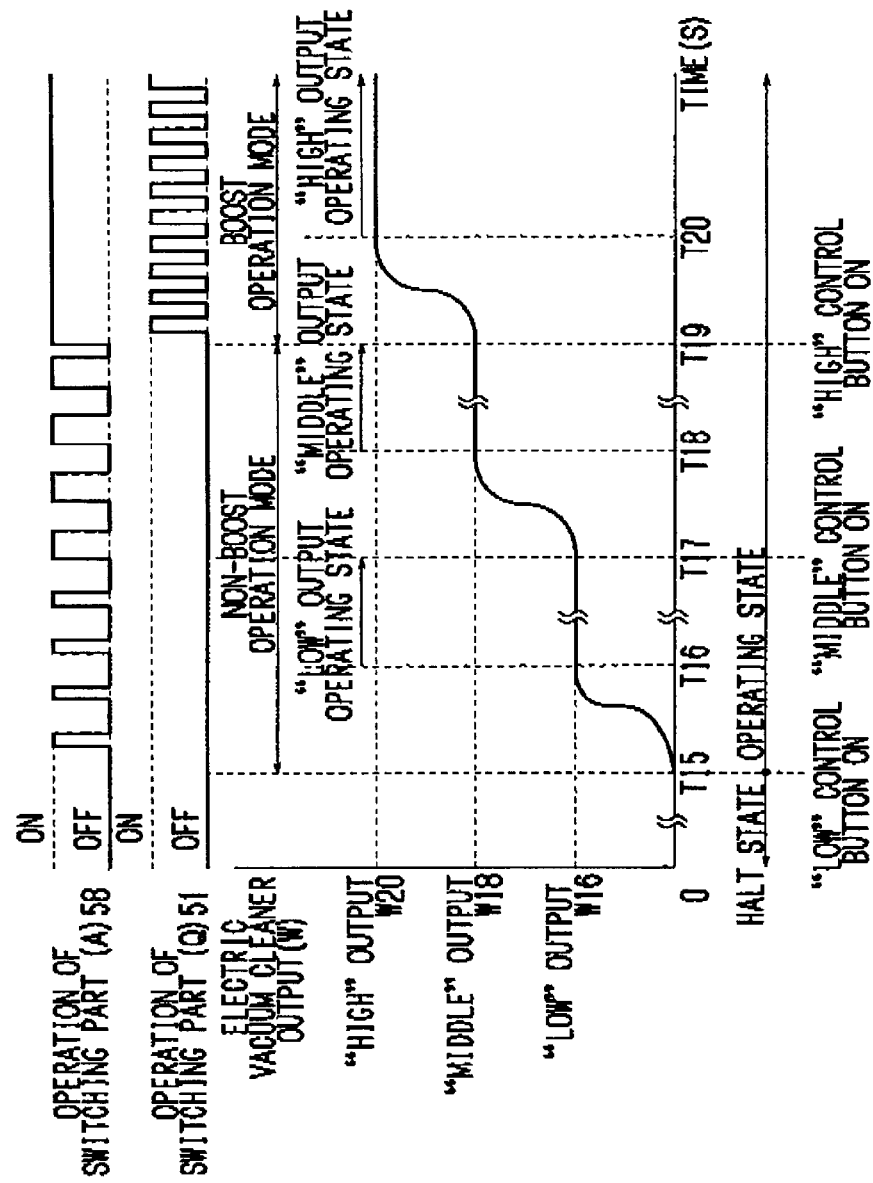
FIG. 23 is an explanatory diagram showing a still further example of the operation control of the electric vacuum cleaner according to the embodiment of the present invention.
Figure 24:
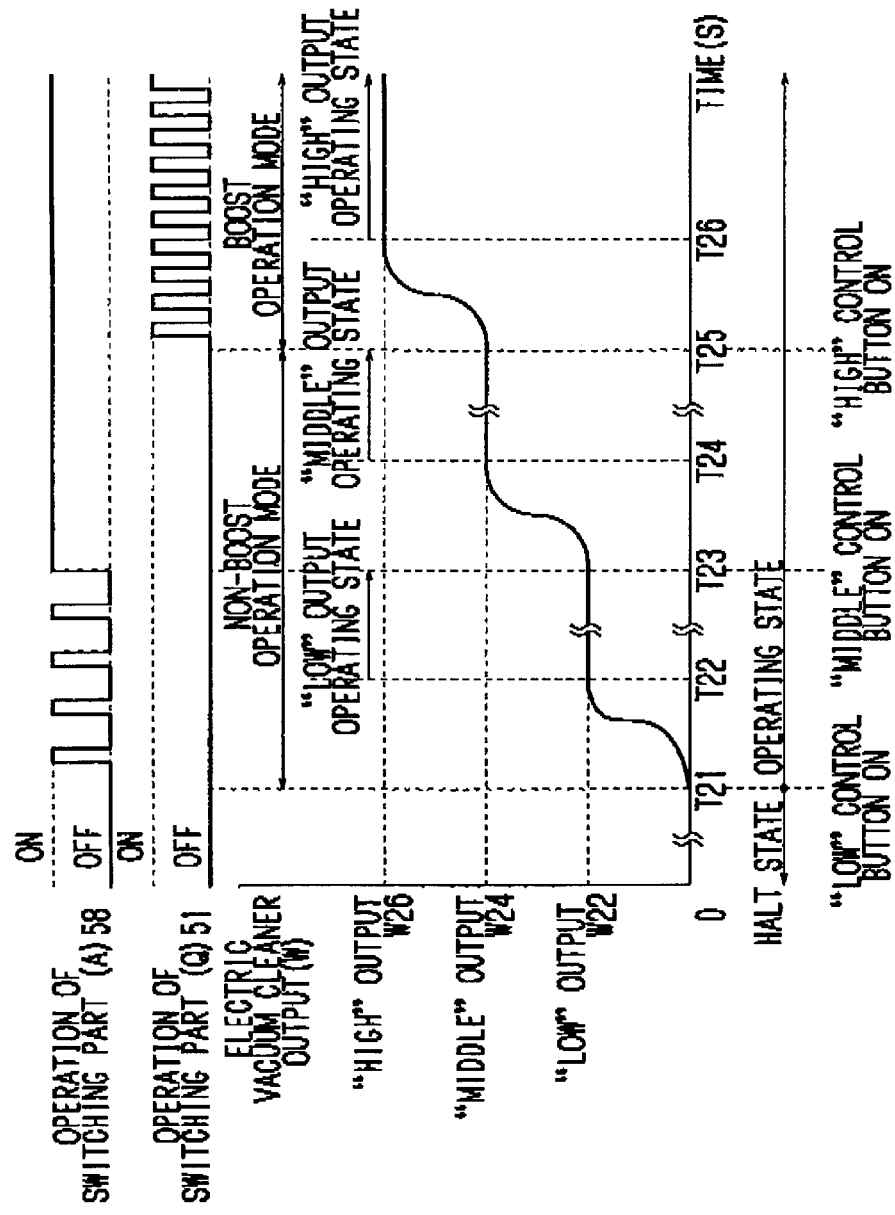
FIG. 24 is an explanatory diagram illustrating a still further example of the operation control of the electric vacuum cleaner according to the embodiment of the present invention.

As in the case of the operation examples shown in FIGS. 22 through 24, a process for controlling the switching operation of the switching part (Q) 51 constitutes a switching means for selecting any one of the output voltage of the DC power supply 10 and the output voltage of the voltage converting means 19 together with the switching part (Q) 51.

Such a control circuit is capable of switching between the non-boost operation mode and the boost operation mode owing to the operation of one switching part (Q) 51. Thus, the number of switching parts can be reduced and the configuration of the switching means is simplified, as compared with a configuration having a bypass path for the voltage converting means main circuit 19a, like the control circuits shown in FIGS. 14 and 19, thus making it possible to bring the electric vacuum cleaner 1 into less size and weight.

In the control circuit shown in FIG. 21, the switching part (A) 58 is a part capable of directly controlling the supply of the output voltage boosted by the voltage converting means 19 to the motor-driven blower. However, when the switching part (A) 58 is brought into an on/off operating state in the boost operation mode, the switching part (Q) 51 is also in an operating state in which it repeats on/off operations. Therefore, the ripple of a voltage inputted to the motor-driven blower 6 becomes large, thus leading to vibrations and noise. Thus, as in the operation examples shown in FIGS. 23 and 24, the state of operation of the switching part (A) 58 in the boost operation mode may be controlled so as to take normally-on because the variations and noise of the motor-driven blower 6 can be reduced. Since losses produced due to a switching operation can be eliminated, the service hour of a battery can be made long.

[Example of Still Further Configuration of Control Circuit]

Figure 25:
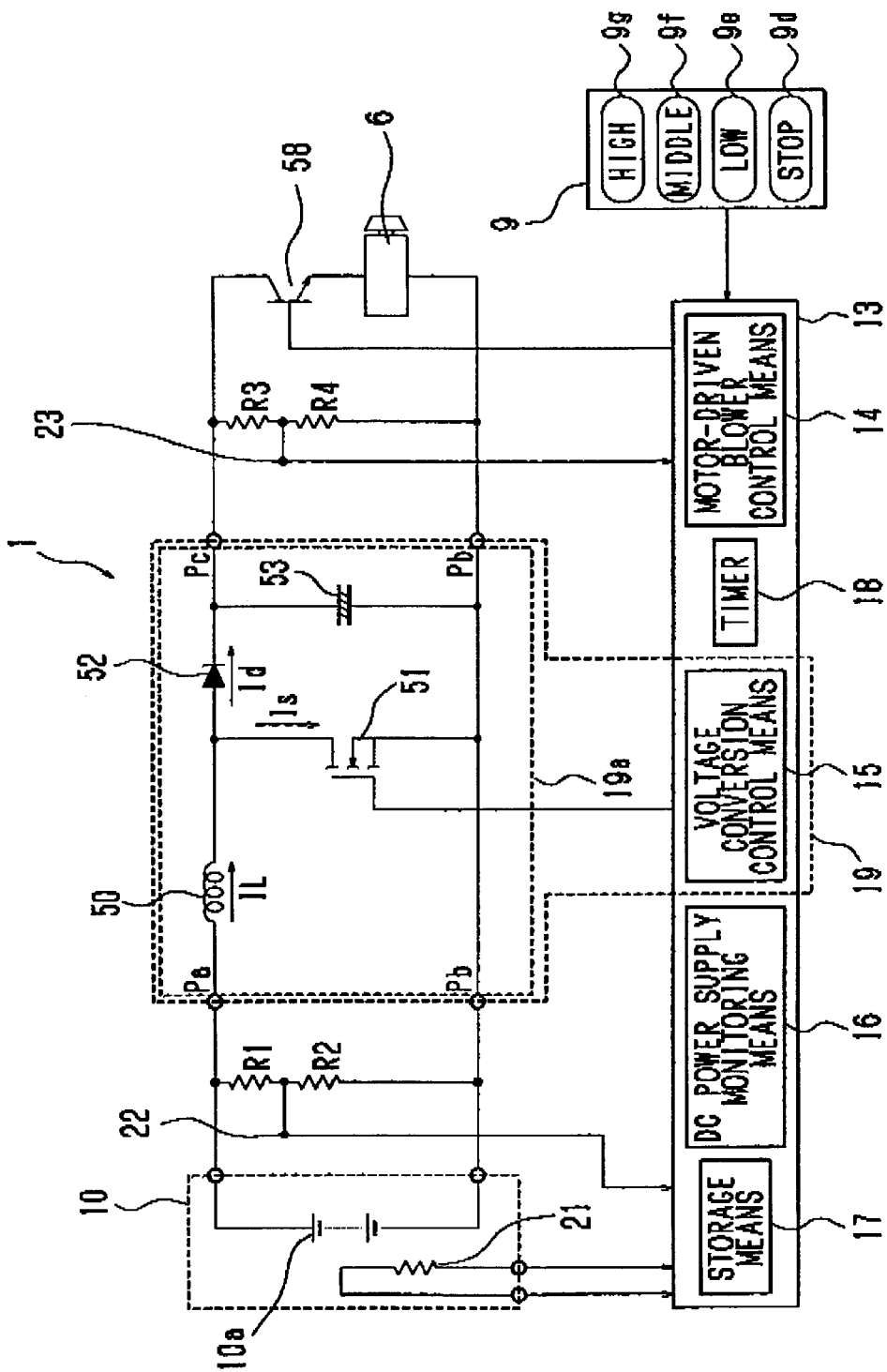
FIG. 25 is a circuit diagram depicting a still further example of the control circuit of the electric vacuum cleaner according to the embodiment of the present invention.

A still further control circuit for the motor-driven blower 6 in the electric vacuum cleaner 1 is next shown in FIG. 25. While the switching part (A) 58 is provided on the low voltage side of the motor-driven blower 6 as the switching part (A) in the control circuit shown in FIG. 21, a switching part (A) 59 used as a switching means is provided on the high voltage side of the motor-driven blower 6 in the control circuit shown in FIG. 25. The switching part (A) 59 operates in a manner similar to the switching part (A) 58 of the control circuit shown in FIG. 21, thus making it possible to bring about a similar effect.

[Example of Further Configuration of Voltage Converting Means]

Figure 26:
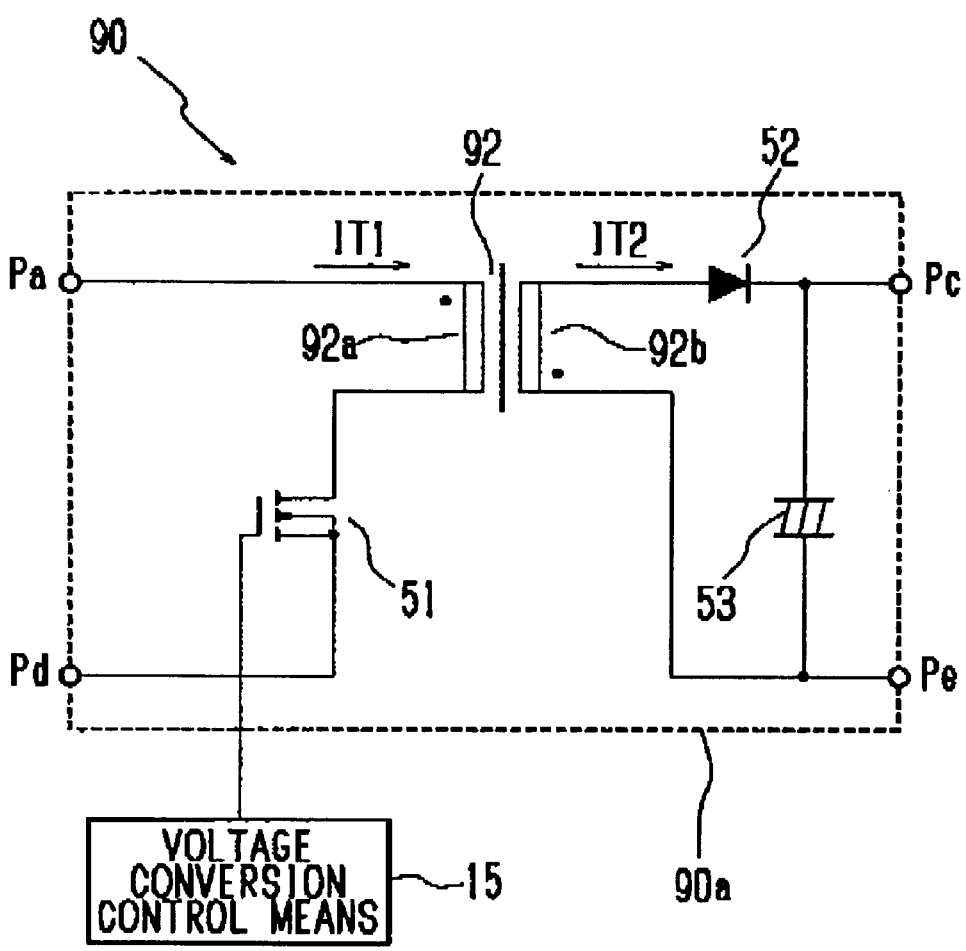
FIG. 26 is a circuit diagram showing a further example of the circuit used for the voltage converting means of the electric vacuum cleaner according to the embodiment of the present invention.

An example of a further configuration of the voltage converting means for the motor-driven blower 6 in the electric vacuum cleaner 1 will next be described with reference to FIG. 26. In a voltage converting means 90 employed in the present embodiment, a transformer 92 having a primary winding 92a and a secondary winding 92b is used as a magnetic part. The primary winding 92a and the secondary winding 92b of the transformer 92 are reversely connected.

Described more specifically, the voltage converting means 90 has an input terminal Pa and a common terminal Pd on the input side, which are connected to a DC power supply 10, and an output terminal Pc and a common terminal Pe on the output side, which are connected to the motor-driven blower 6. The voltage converting means 90 is configured in such a manner that the input terminal Pa and one terminal of the primary winding 92a of the transformer 92 are connected to each other, the other terminal of the primary winding 92a of the transformer 92 and a drain terminal of a switching part (Q) 51 are connected to each other, a source terminal of the switching part (Q) 51 and the common terminal Pd are connected to each other, the output of a voltage conversion control means 15 is connected to a control terminal of the switching part (Q) 51, one terminal of the secondary winding 92b of the transformer 92 is connected to an anode terminal of a diode 52, a cathode terminal of the diode 52 and one terminal of a capacitor 53 are connected to each other, the other terminal of the capacitor 53 and the other terminal of the secondary winding 92b of the transformer 92 are connected to each other, a point where the diode 52 and the capacitor 53 are connected, is connected to the output terminal Pc, a point where the capacitor 53 and the secondary winding 92b of the transformer 92 are connected, is connected to the common terminal Pe, and a voltage obtained by boosting a voltage outputted from the DC power supply 10 is outputted between the output terminal Pc and the common terminal Pe.

A boosting operation of such a voltage converting means 90 will be explained. When the switching part (Q) 51 is turned on in response to a pulse signal outputted from the voltage conversion control means 15, a current IT1 flows so that energy is stored in the transformer 92. Since, at this time, the primary winding 92a and the secondary winding 92b in the transformer 92 are reversely connected to each other, no current flows into the secondary side owing to the diode 52.

When the switching part (Q) 51 is turned off by the voltage conversion control means 15, a back electromotive voltage occurs in the corresponding winding of the transformer 92 and hence the potential is inverted. Therefore, the energy stored in the transformer 92 is discharged into the secondary winding 92b side as a current IT2 via the diode 52. A voltage higher than that of the DC power supply 10 is charged into the capacitor 53 and supplied to the motor-driven blower 6.

Figure 27:
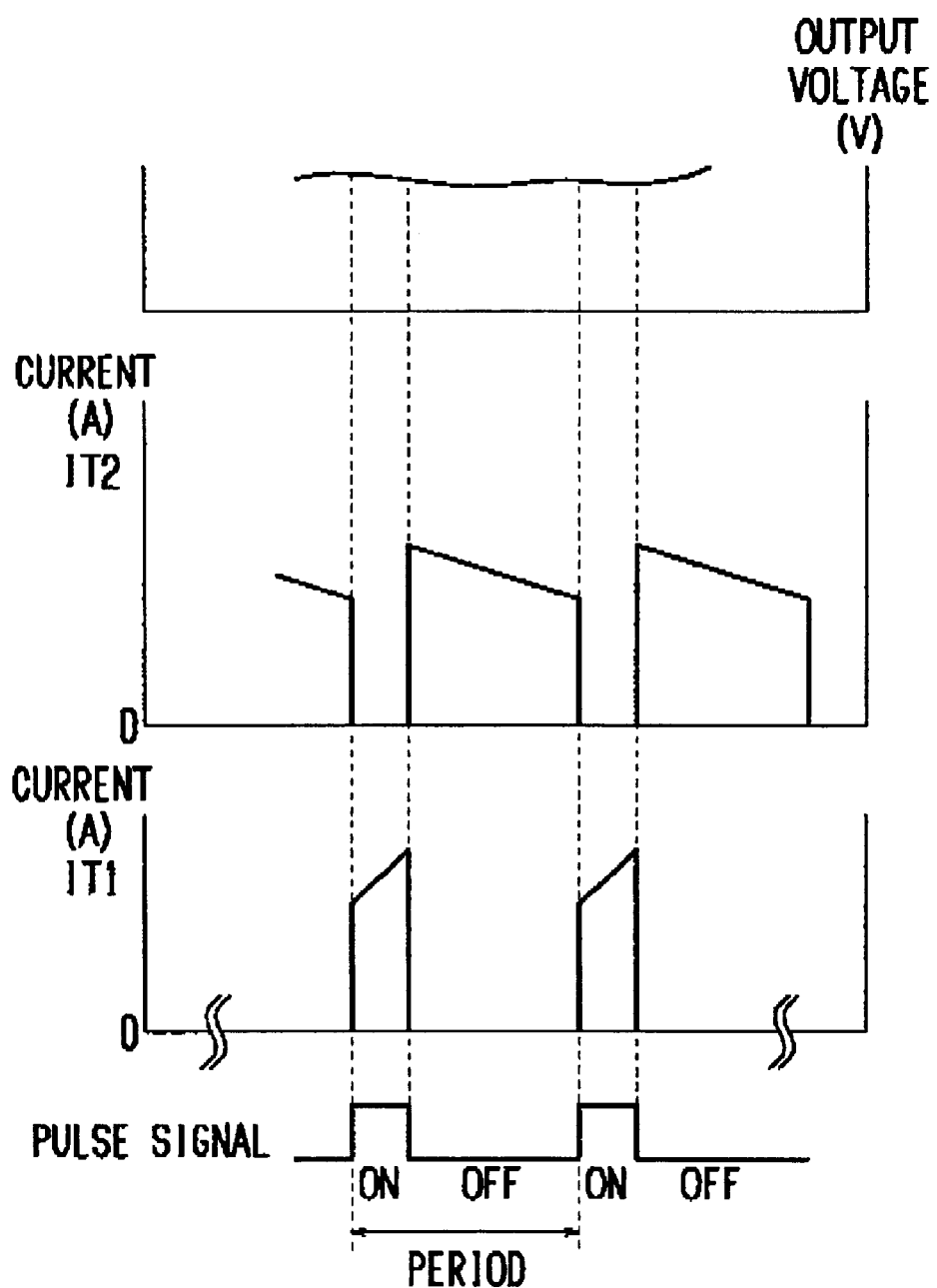
FIG. 27 is an explanatory diagram illustrating currents that flow in a voltage converting means main circuit of the electric vacuum cleaner according to the embodiment of the present invention, a voltage outputted from the voltage converting means and a pulse signal outputted therefrom.

Controlling at least the frequency or duty of a pulse signal outputted from the voltage conversion control means 15 in such a configuration provides a current continuous mode for storing energy in a remaining state of the energy in the transformer 92 used as the magnetic part. The current waveform currents IT1 and IT2 that respectively flow into the primary winding 92a and the secondary winding 92b of the transformer 92 at this time, are illustrated in FIG. 27. Thus, the current IT1 and IT2 continuously flow in the voltage converting means main circuit 90a, thereby resulting in the current continuous mode.

Thus, even the present embodiment is capable of obtaining operations and effects similar to the voltage converting means 19 shown in FIG. 4.

[Operation Mode Switching Control Unit]

An example of another configuration of the operation mode switching control unit according to the present invention will next be described based on FIG. 28. FIG. 28 is a front view showing one example of an operation mode switching control unit 71.

The operation mode switching control unit 71 according to the present embodiment is provided with a power operation setting control button 71d in addition to a stop setting control button 71a, a low-operation setting control button 71b and a middle-operation setting control button 71c. These control buttons 71a, 71b, 71c and 71d are successively arranged side by side in a line. Of operation modes set by these respective control buttons 71a, 71b, 71c and 71d, the operation modes indicative of "low" and "middle", which are set by the low-operation setting control button 71b and the middle-operation setting control button 71c, respectively correspond to non-boost operation modes in which the output voltages boosted by the voltage converting means 19 and 90 are not supplied to the motor-driven blower 6. On the other hand, the power operation mode set by the power operation setting control button 71d is a boost operation mode for supplying the output voltages boosted by the voltage converting means 19 and 90 to the motor-driven blower 6. Therefore, the power operation mode rather than the middle operation mode provides high power consumption of the DC power supply 10, a large output of the motor-driven blower 6 and high dust suction power.

In the present embodiment in view of this sense, each of the low-operation setting control button 17b and the middle-operation setting control button 71c functions as a control part for selecting the non-boost operation mode. The power operation setting control button 71d functions as a control part for selecting the boost operation mode, and the operation mode switching control unit 71 functions as a control part for performing switching between the boost operation mode and the non-boost operation mode. Therefore, in the present embodiment, the boost operating control button 71d is provided so as to take a button form separated and different from the normal control buttons 71b and 71c for specifying "high" and "low" of a driving force of the motor-driven blower 6.

Thus, in the present embodiment, the control button 71d (boost operation mode control part) for operating the voltage converting means 19 and 90, and the control buttons 71b and 71c for deactivating them can be shown to a user in a way easy to understand them.

As specific means for allowing a user to make it easier to understand the boost operation mode for supplying the output voltages boosted by the voltage converting means 19 and 90 to the motor-driven blower 6 and allowing the user to make it easier to recognize that the control button 9d is a button for indicating that the DC power supply 10 is high in power consumption and for bringing dust suction power to a maximum level in a maximum output operation mode of the motor-driven blower 6, the following means are effective.

(1) The control button 71d for supplying the output voltages boosted by the voltage converting means 19 and 90 to the motor-driven blower 6 and the control buttons 71*b* and 71*c* for directly supplying the output voltage of the DC power supply 10 to the motor-driven blower 6 are individually provided.

(2) As a notated character for the control button 71*d* for supplying the output voltages boosted by the voltage converting means 19 and 90 to the motor-driven blower 6, a character completely different in form, like "power" is used as in the case of "high" without using characters associated with "middle" and "low".

(3) Forms (such as color, fonts, etc.) of notated characters for the control button 17*d* for supplying the output voltages boosted by the voltage converting means 19 and 90 to the motor-driven blower 6, and the control buttons 71*b* and 71*c* for directly supplying the output voltage of the DC power supply 10 to the motor-driven blower 6, forms of their backgrounds (color and patterns), etc. are changed.

(4) In association with the stop control button 71*a*, the power control button 71*d* fox supplying the output voltages boosted by the voltage converting means 19 and 90 to the motor-driven booster 6 is disposed as shown in FIG. 28*a* with the "low" control button 71*b* and "middle" control button 71*c* for selecting the non-boost operation mode being interposed therebetween. Since the power control button is separated from the stop control button owing to the adoption of such a layout, as shown in FIG. 28*a*, the effect of preventing the boot operation mode from being used with ease can be brought about. Namely, the boost operation mode in which the above-described power consumption of the DC power supply 10 is high, is used to a required minimum.

(5) Even if the placement of such control buttons as shown in FIG. 28*b* is taken as a modification of FIG. 28*a* where a shape restriction is imposed on the operation mode switching control unit 71, a similar effect is obtained.

(6) As shown in FIG. 29 as another form, control buttons (71*b* and 71*c*) for selecting a non-boost operation mode and a control button 71*d* for selecting a boost operation mode are disposed on both sides with a stop control button 71*a* interposed therebetween. Owing to such placement, the operation of allowing a user of an electric vacuum cleaner using these modes to intentionally distinguish them from one another is brought about, and the effect of preventing an inadvertent use of a boost operation mode is brought about. Even if the placement of such control buttons as shown in FIG. 28*b* is taken as a modification of FIG. 28*a* where a shape restriction is imposed on the control means 71, a similar effect can be obtained.

A specific circuit configuration of the operation mode switching control unit 71 is next shown in FIG. 30. The configuration resides in that one operation mode is added to the operation mode switching control unit 9 shown in FIG. 9.

In a manner similar to the operation mode switching control unit 9 referred to above, the operation mode switching control unit 71 is capable of selecting and setting a plurality of voltages. Further, the voltage set by the operation mode switching control unit 71 is read by a voltage reading means 109, and switching is performed between a plurality of electric vacuum cleaner operation modes according to the read voltage. Therefore, the addition of the operation mode can be realized at low cost without an increase in signal lines for the operation mode switching control unit 71 and an ADC 108.

Obviously, numerous modifications and variations of the present invention are possible in light of the above teachings. It is therefore to be understood that within the scope of the appended claims, the invention may be practiced otherwise than as specifically described herein.

What is claimed is:

1. An electric vacuum cleaner comprising:

a motor-driven blower driven with a DC power supply as a drive source;

voltage converting means for boosting a voltage output from the DC power supply and supplying power to the motor-driven blower;

switching means for switching an operation mode of a non-boost operation mode for outputting the output voltage of the DC power supply to the motor-driven blower and a boost operation mode for outputting the output voltage boosted by the voltage converting means to the motor-driven blower;

an operation mode switching control unit for selecting the non-boost operation mode or the boost operation mode; and electric vacuum cleaner control means for controlling the switching means according to a select operation of the operation mode switching control unit and thereby switching between the operation modes for the motor-driven blower, wherein the operation mode switching control unit is provided with a boost control part for selecting the boost operation mode, and when rotational driving of the motor-driven blower is stopping and the boost control part is selected, the electric vacuum cleaner control means allows the boost operation mode after the non-boost operation mode.

2. An electric vacuum cleaner comprising:

a motor-driven blower driven with a DC power supply as a drive source;

voltage converting means for boosting a voltage output from the DC power supply and supplying power to the motor-driven blower;

switching means for switching an operation mode of a non-boost operation mode for outputting the output voltage of the DC power supply to the motor-driven blower and a boost operation mode for outputting the output voltage boosted by the voltage converting means to the motor-driven blower;

an operation mode switching control unit for selecting the non-boost operation mode or the boost operation mode; and electric vacuum cleaner control means for controlling the switching means according to a select operation of the operation mode switching control unit and thereby switching between the operation modes for the motor-driven blower, wherein the operation mode switching control unit includes a stop control part for stopping rotational driving of the motor-driven blower, and when the stop control part is selected in the boost operation mode, the electric vacuum cleaner control means allows rotational driving of the motor-driven blower to stop after the non-boost operation mode.

3. An electric vacuum cleaner comprising:

a motor-driven blower driven with a DC power supply as a drive source;

voltage converting means for boosting a voltage output from the DC power supply and supplying power to the motor-driven blower;

switching means for switching an operation mode of a non-boost operation mode for outputting the output voltage of the DC power supply to the motor-driven blower and a boost operation mode for outputting the output voltage boosted by the voltage converting means to the motor-driven blower;

an operation mode switching control unit for selecting the non-boost operation mode or the boost operation mode; and electric vacuum cleaner control means for controlling the switching means according to a select operation of the operation mode switching control unit and thereby switching between the operation modes for the motor-driven blower, wherein the electric vacuum cleaner control means detects an output voltage of the DC power supply and changes an output voltage boosted by the voltage converting means according to the detected output voltage of the DC power supply.

4. An electric vacuum cleaner comprising:

a motor-driven blower driven with a DC power supply as a drive source;

voltage converting means for boosting a voltage output from the DC power supply and supplying power to the motor-driven blower;

switching means for switching an operation mode of a non-boost operation mode for outputting the output voltage of the DC power supply to the motor-driven blower and a boost operation mode for outputting the output voltage boosted by the voltage converting means to the motor-driven blower;

an operation mode switching control unit for selecting the non-boost operation mode or the boost operation mode; and electric vacuum cleaner control means for controlling the switching means according to a select operation of the operation mode switching control unit and thereby switching between the operation modes for the motor-driven blower, wherein the electric vacuum cleaner control means detects an output voltage of the DC power supply in the boost operation mode and switches the operation mode of the motor-driven blower from the boost operation mode to the non-boost operation mode according to the detected output voltage of the DC power supply.

5. An electric vacuum cleaner comprising:

a motor-driven blower driven with a DC power supply as a drive source;

voltage converting means for boosting a voltage output from the DC power supply and supplying power to the motor-driven blower;

switching means for switching an operation mode of a non-boost operation mode for outputting the output voltage of the DC power supply to the motor-driven blower and a boost operation mode for outputting the output voltage boosted by the voltage converting means to the motor-driven blower;

an operation mode switching control unit for selecting the non-boost operation mode or the boost operation mode; and electric vacuum cleaner control means for controlling the switching means according to a select operation of the operation mode switching control unit and thereby switching between the operation modes for the motor-driven blower, wherein the DC power supply includes a battery, and the electric vacuum cleaner control means detects the capacity of the battery and changes an output voltage boosted by the voltage converting means according to the detected capacity of the battery.

6. An electric vacuum cleaner comprising:

a motor-driven blower driven with a DC power supply as a drive source;

voltage converting means for boosting a voltage output from the DC power supply and supplying power to the motor-driven blower;

switching means for switching an operation mode of a non-boost operation mode for outputting the output voltage of the DC power supply to the motor-driven blower and a boost operation mode for outputting the output voltage boosted by the voltage converting means to the motor-driven blower;

an operation mode switching control unit for selecting the non-boost operation mode or the boost operation mode; and electric vacuum cleaner control means for controlling the switching means according to a select operation of the operation mode switching control unit and thereby switching between the operation modes for the motor-driven blower, wherein the DC power supply includes a battery, and the electric vacuum cleaner control means detects the capacity of the battery in the boost operating mode and switches the operation of the motor-driven blower from the boost operation mode to the non-boost operation mode according to the detected capacity of the battery.

7. An electric vacuum cleaner, comprising:

a voltage convertor including a magnetic element storing energy supplied from a DC power supply, a switching element turning on and off according to a switching signal, and a switching control means providing the switching signal to the switching element for controlling the switching element with the switching signal, the magnetic element executing repetition of storage and emission with respect to energy according to turn on and off of the switching element so that the voltage convertor boosts a voltage output from the DC power source and outputs the boosted voltage; and a motor-driven blower driven by the voltage output from the voltage convertor, wherein the switching control means sets a frequency of the switching signal to store the energy into the magnetic element on a condition that the energy remains in the magnetic element.

8. An electric vacuum cleaner, comprising:

a voltage convertor including a magnetic element storing energy supplied from a DC power supply, a switching element turning on and off according to a switching signal, and a switching control means providing the switching signal to the switching element for controlling the switching element with the switching signal, the magnetic element executing repetition of storage and emission with respect to energy according to turn on and off of the switching element so that the voltage convertor boosts a voltage output from the DC power source and outputs the boosted voltage; and a motor-driven blower driven by the voltage output from the voltage convertor, wherein the switching control means sets a duty cycle of the switching signal to store the energy into the magnetic element on a condition that the energy remains in the magnetic element.

9. An electric vacuum cleaner, comprising:

a voltage convertor including a magnetic element storing energy supplied from a DC power supply, a switching element turning on and off according to a switching signal, and a switching control means providing the switching signal to the switching element for controlling the switching element with the switching signal, the magnetic element executing repetition of storage and emission with respect to energy according to turn on and off of the switching element so that the voltage convertor boosts a voltage output from the DC power source and outputs the boosted voltage; and a motor-driven blower driven by the voltage output from the voltage convertor, wherein the switching control means controls a frequency of the switching signal to store the energy into the magnetic element on a condition that the energy remains in the magnetic element.

10. An electric vacuum cleaner, comprising:

a voltage convertor including a magnetic element storing energy supplied from a DC power supply, a switching element turning on and off according to a switching signal, and a switching control means providing the switching to the switching element for controlling the switching element with the switching signal, the magnetic element executing repetition of storage and emission with respect to energy according to turn on and off of the switching element so that the voltage convertor boosts a voltage output from the DC power source and outputs the boosted voltage; and a motor-driven blower driven by the voltage output from the voltage converting means, wherein the switching control means controls a duty cycle of the switching signal to store the energy into the magnetic element on a condition that the energy remains in the magnetic element.

* * * * *